(12) United States Patent
Kiriya

(10) Patent No.: US 9,731,714 B2
(45) Date of Patent: Aug. 15, 2017

(54) VEHICLE APPARATUS

(71) Applicant: FUJITSU TEN LIMITED, Kobe-shi, Hyogo (JP)

(72) Inventor: Takechika Kiriya, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 56 days.

(21) Appl. No.: 14/742,220

(22) Filed: Jun. 17, 2015

(65) Prior Publication Data
US 2015/0375741 A1 Dec. 31, 2015

(30) Foreign Application Priority Data

Jun. 25, 2014 (JP) .................................. 2014-130221
Jul. 9, 2014 (JP) .................................. 2014-141206

(51) Int. Cl.
| | | |
|---|---|---|
| B60W 30/06 | (2006.01) | |
| G05D 1/00 | (2006.01) | |
| G06K 9/00 | (2006.01) | |
| H04N 7/18 | (2006.01) | |

(52) U.S. Cl.
CPC ........... B60W 30/06 (2013.01); G05D 1/0011 (2013.01); G06K 9/00355 (2013.01); H04N 7/18 (2013.01); B60W 2550/404 (2013.01); B60W 2600/00 (2013.01); B60W 2710/20 (2013.01)

(58) Field of Classification Search
CPC .. B60L 11/1838; Y02T 10/7088; Y02T 90/14; B60W 30/06; G06K 9/00355; G05D 1/0011
See application file for complete search history.

(56) References Cited

U.S. PATENT DOCUMENTS

| | | | |
|---|---|---|---|
| 6,701,296 B1 * | 3/2004 | Kramer ................ | A61B 5/6806 370/545 |
| 6,856,327 B2 * | 2/2005 | Choi ..................... | G06F 1/1626 345/157 |
| 8,421,448 B1 * | 4/2013 | Tran ....................... | G01R 33/07 324/207.2 |
| 2014/0139454 A1 * | 5/2014 | Mistry ................... | G06F 3/041 345/173 |

FOREIGN PATENT DOCUMENTS

| | | |
|---|---|---|
| JP | H07219703 A | 8/1995 |
| JP | 2002149202 A | 5/2002 |
| JP | 2005143015 A | 6/2005 |
| JP | 2006306233 A | 11/2006 |
| JP | 2008174192 A | 7/2008 |
| JP | 2008284969 A | 11/2008 |
| JP | 2012509812 A | 4/2012 |

* cited by examiner

*Primary Examiner* — Jelani Smith
*Assistant Examiner* — Jordan S Fei
(74) *Attorney, Agent, or Firm* — Oliff PLC

(57) ABSTRACT

A vehicle apparatus used in a vehicle measures a first elapsed time after completion of a parking operation by which the vehicle is parked in a parking region, and prohibits movement of the vehicle to adjust the parking position when the first elapsed time reaches a first predetermined time before receipt of a instruction signal by the receiver. Accordingly, it is possible to improve safety by preventing the vehicle from moving out of a parking position even if the moving part is erroneously operated when the predetermined time elapses after the completion of parking operation.

17 Claims, 16 Drawing Sheets

| MOVEMENT INSTRUCTIONS INDICATED BY MOTION OF USER | MODES OF MAJOR ACCELERATION OF MOBILE DEVICE | IMAGES OF USER CAPTURED BY CAMERA |
|---|---|---|
| REARWARD MOVEMENT | FRONT-TO-REAR ACCELERATION OCCURS | |
| FORWARD MOVEMENT | REAR-TO-FRONT ACCELERATION OCCURS | |
| LEFT TURN | RIGHT-TO-LEFT ACCELERATION OCCURS | |
| RIGHT TURN | LEFT-TO-RIGHT ACCELERATION OCCURS | |
| STOP | NO ACCELERATION OCCURS | |

FIG.13

VEHICLE APPARATUS

BACKGROUND OF THE INVENTION

Field of the Invention

The present invention relates to a technology for operating a vehicle.

Description of the Background Art

In the related art, a technology for adjusting a parking position by operating a vehicle from outside the vehicle after the parking of the vehicle is known. Such a technology improves convenience in driving by eliminating the necessity of an advanced driving technique of moving a vehicle position delicately, and inconvenience of re-boarding a vehicle.

In the technology in the related art, a vehicle position is prohibited from being adjusted when an adjustment instruction is not re-transmitted from a remote control within a predetermined time after a driver adjusts the vehicle position using the remote control from outside the vehicle. Accordingly, when the driver erroneously operates the remote control after leaving the vicinity of the vehicle, the vehicle is prevented from moving, and as a result, safety is ensured.

However, since the tracking of a predetermined time does not start when the driver does not issue an adjustment instruction, an erroneous operation of the remote control may cause the vehicle to move, which is a problem. In this case, the vehicle may move without being noticed by the driver, and therefore, a task is to ensure safety.

In the technology in the related art, the vehicle detects an instruction associated with a motion of the driver using a vehicle-mounted camera, and automatically moves in an instructed direction. In this case, the driver can easily instruct the vehicle to move without operating the remote control or the like.

However, the position of the vehicle-mounted camera changes with the movement of the vehicle. For this reason, the driver may stray out of the imaging range of the vehicle-mounted camera unintentionally, or may face the vehicle obliquely. In this case, the vehicle may erroneously detect an instruction from the driver, and may move in a direction different from an intention of the driver, which is a problem to be solved.

SUMMARY OF THE INVENTION

According to an aspect of the invention, a vehicle apparatus used in a vehicle, the apparatus includes: a clock configured to measure a first elapsed time after completion of a parking operation by which the vehicle is parked in a parking region; a receiver configured to receive an instruction signal from a mobile device operated by a user outside the vehicle; and a control unit configured to cause movement of the vehicle to adjust a parking position of the vehicle in response to the received instruction signal. The control unit is further configured to prohibit the movement of the vehicle to adjust the parking position when the first elapsed time reaches a first predetermined time before receipt of the instruction signal by the receiver. Accordingly, it is possible to improve safety by preventing the vehicle from moving out of a parking position even if the control unit is erroneously operated when the predetermined time elapses after the completion of parking.

According to another aspect of the invention, the vehicle apparatus further includes: a first recognition part configured to recognize, based on a motion signal transmitted from the mobile device that is moved in association with a motion of a body of the user, a movement instruction based on the motion of the body of the user, the movement instruction being indicative of moving the vehicle; and a second recognition part configured to recognize the movement instruction based on a detection result of a detector that is configured to detect the motion of the body of the user. The control unit causes the vehicle to be moved when a recognized result obtained by the first recognition part coincides with a recognized result obtained by the second recognition part. Accordingly, it is possible to move the vehicle while reliably recognizing an instruction for moving the vehicle from the user.

An object of the present invention is to provide a technology by which the parking position of a vehicle is safely adjusted.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 illustrates an example of motion data.

DESCRIPTION OF THE EMBODIMENTS

Hereinafter, embodiments of the present invention will be described with reference to the accompanying drawings.

First Embodiment

1-1. Outline

Figure 1:
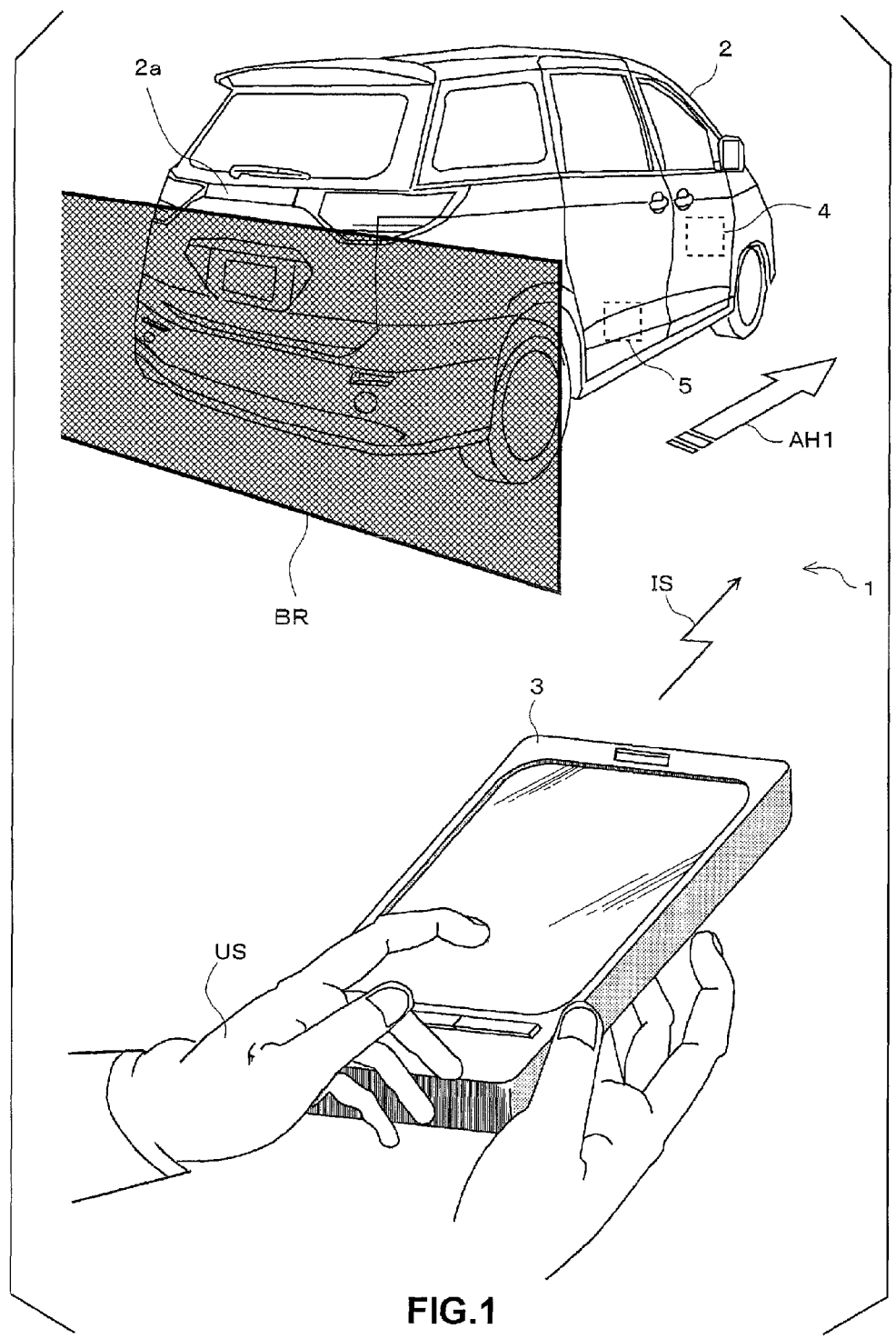
FIG. 1 illustrates an outline of a vehicle system.

FIG. 1 illustrates a mode in which a user (mainly a driver) US adjusts the parking position of a vehicle 2 from outside the vehicle using a vehicle control system 1. The user US may park the vehicle 2 too close to an obstacle BR such as a fence at a parking lot partitioning off a parking region, and thereby, the user US may not be able to open a vehicle door such as a rear gate 2a. A vehicle front end portion may jut out over the parking region, and thereby, the vehicle 2 may become an obstacle to parking other vehicles. In this case, it is necessary for the user to re-board the vehicle, and to adjust the parking position. However, the user US requires skill when driving the vehicle for delicate adjustment of the parking position, and an unskillful user may have to re-adjust the parking position while going back and forth between a driver's seat and outside the vehicle several times.

In the vehicle control system 1, the user US confirms the distance between the vehicle 2 and the obstacle BR from outside the vehicle, and then the user US transmits an instruction IS to a vehicle apparatus 4 mounted in the vehicle 2 by operating a mobile device 3. The vehicle apparatus 4 controls a vehicle moving apparatus 5 for driving an engine such that the vehicle 2 moves delicately in a direction that is denoted by arrow AH1 and desired by the user US. For example, the vehicle moving apparatus 5 moves the vehicle 2 forward by 10 centimeters so that the rear gate 2a of the vehicle 2 can be opened without coming into contact with the obstacle BR. Accordingly, in the vehicle control system 1, it is possible to adjust the position of the vehicle 2 while confirming the position of the vehicle 2 from outside the vehicle, it is not necessary for the user US to re-perform a delicate driving operation while going back and forth between the driver's seat and outside the vehicle several times and confirming the obstacle BR via rearview mirrors or the like with the naked eye, and it is possible to improve convenience when the user US parks the vehicle 2.

1-2. Configuration

Figure 2:
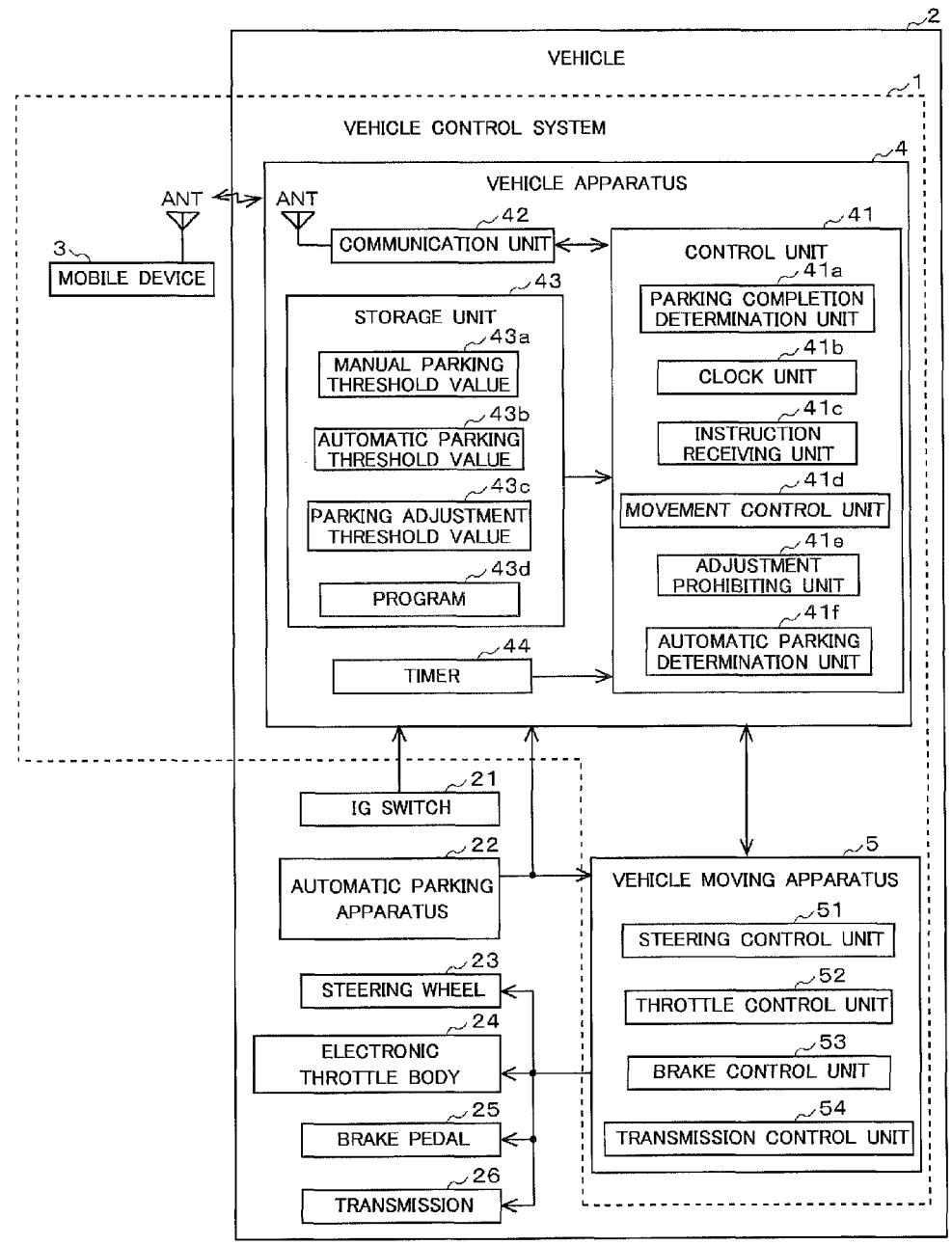
FIG. 2 illustrates a configuration of a vehicle apparatus and a vehicle moving apparatus.

FIG. 2 illustrates a configuration of the vehicle control system 1. The vehicle control system 1 includes the mobile device 3, the vehicle apparatus 4, and the vehicle moving apparatus 5. The mobile device 3 is a compact communication terminal held by the user. For example, the mobile device 3 is a mobile phone, a smartphone, or an electronic vehicle key.

The vehicle apparatus 4 is an electronic control apparatus that is disposed in the vehicle 2 and is controlled by a microcomputer. The vehicle apparatus 4 communicates wirelessly with the mobile device 3, and controls the vehicle moving apparatus 5 (to be described later) in response to an instruction signal from the mobile device 3 such that the parking position of the vehicle 2 is adjusted. The vehicle apparatus 4 includes a control unit 41, a communication unit 42, and a storage unit 43.

The control unit 41 is a microcomputer configured to include a CPU, a RAM, and a ROM. The control unit 41 controls the entirety of the vehicle apparatus 4. The function of the control unit 41 will be described later.

The communication unit 42 includes an antenna, and communicates wirelessly with the mobile device 3 using information communication technologies such as worldwide interoperability for microwave access (WiMAX) and long term evolution (LTE). The communication unit 42 receives an instruction signal indicative of adjusting the parking position of the vehicle 2 from the mobile device 3.

The storage unit 43 is a storage medium configured to store data. The storage unit 43 is a non-volatile memory such as a hard disk drive configured to include an electrical erasable programmable read-only memory (EEPROM), a flash memory, or a magnetic disk. The storage unit 43 stores a manual parking threshold value 43a, an automatic parking threshold value 43b, a parking adjustment threshold value 43c, and a program 43d.

The manual parking threshold value 43a is time data that specifies the amount of time between the completion of parking performed by the user and the prohibition of adjustment of the parking position. In other words, the manual parking threshold value 43a is time data that specifies the amount of time between the completion of parking performed by the user and the permission of adjustment of the parking position. For example, the manual parking threshold value 43a may be set to 30 seconds. The manual parking threshold value 43a may be set to be an amount of time required for the user to be able to determine whether to require the adjustment of a parking position after completing parking, de-boarding the vehicle, and confirming the parking position.

The automatic parking threshold value 43b is time data that specifies the amount of time between the completion of automatic parking and the prohibition of adjustment of the parking position. In other words, the automatic parking threshold value 43b is time data that specifies the amount of time between the completion of automatic parking and the permission of adjustment of the parking position. For example, the automatic parking threshold value 43b may be set to 20 seconds. The automatic parking threshold value 43b may be set to be an amount of time required for the user to be able to determine whether to require the adjustment of a parking position after confirming the completion of automatic parking from outside the vehicle.

The parking adjustment threshold value 43c is time data that specifies the amount of time between the completion of adjustment of the parking position of the vehicle 2 and the prohibition of adjustment of the parking position. In other words, the parking adjustment threshold value 43c is time data that specifies the amount of time between the completion of adjustment of the parking position of the vehicle 2 and the permission of adjustment of the parking position. For example, the parking adjustment threshold value 43c may be set to 10 seconds. The parking adjustment threshold value 43c may be set to be an amount of time required for the user to be able to determine whether to require the re-adjustment of a parking position after adjusting the parking position.

The lengths of time of the manual parking threshold value 43a, the automatic parking threshold value 43b, and the parking adjustment threshold value 43c have the following relationship: the manual parking threshold value 43a>the automatic parking threshold value 43b>the parking adjustment threshold value 43c. That is, since the manual parking threshold value 43a is an amount of time required for the user to determine whether to require the adjustment of a parking position after de-boarding the vehicle and confirming the parking position, it is necessary to set the manual parking threshold value 43a to be a relatively long amount of time. Since the automatic parking threshold value 43b is an amount of time required for the user to determine whether to require the adjustment of a parking position after confirming the completion of automatic parking from outside the vehicle, an amount of time required for the user to de-board the vehicle can be eliminated, and the automatic parking threshold value 43b may be set to a shorter amount of time compared to the manual parking threshold value 43a. Since the parking adjustment threshold value 43c is an amount of time required after the user already confirms a parking position, the parking adjustment threshold value 43c may be set to the amount of time shorter than the manual parking threshold value 43a and the automatic parking threshold value 43b. In addition, each of the threshold values is preferably set to a short amount of time. The reason for this is that it is possible to ensure a long amount of time for preventing an erroneous operation from causing an unexpected movement of the vehicle by ensuring a minimum amount of time required for the user to determine whether to require the adjustment of a parking position, and prohibiting the adjustment of the parking position as early as possible. In the present invention, each of the manual parking threshold value 43*a* and the automatic parking threshold value 43*b* acts as a first predetermined time, and the parking adjustment threshold value 43*c* acts as a second predetermined time.

The program 43*d* is firmware that is read and executed to control the vehicle apparatus 4 by the control unit 41.

A timer 44 is an oscillator configured to transmit a clock signal to the control unit 41 at constant intervals.

The function of the control unit 41 will be described. The control unit 41 includes a parking completion determination unit 41*a*; a clock unit 41*b*; an instruction receiving unit 41*c*; a movement control unit 41*d*; an adjustment prohibiting unit 41*e*; and an automatic parking determination unit 41*f*.

The parking completion determination unit 41*a* determines whether the parking of the vehicle 2 is completed. When the parking completion determination unit 41*a* detects an off state of an JO signal output from an IG switch 21 (that is, when an IG signal is not output), the parking completion determination unit 41*a* determines that parking is completed. Since an electrical system of the vehicle 2 is stopped when the IG signal comes into an off state, it is possible to determine that the driving of the vehicle by the user is completed. When the parking completion determination unit 41*a* determines that the parking is completed, the parking completion determination unit 41*a* controls a parking completion flag to "ON". The parking completion flag is stored in a flag register of the control unit 41. The parking completion determination unit 41*a* may determine that parking is completed when the closing of a vehicle door is detected after the vehicle door is opened, in addition to detecting an off state of the IG signal. The reason for this is that the closing of the vehicle door after the opening thereof indicates that the user de-boards the vehicle 2, and it can be determined that the user has no intention of driving the vehicle for parking any more.

The clock unit 41*b* is a counter configured to receive a clock signal from the timer 44, and to measure (track) an elapse of time by adding times elapsed. The clock unit 41*b* determines whether the elapsed time reaches a predetermined value. The clock unit 41*b* starts when the parking of the vehicle 2 is completed. The amount of time tracked when parking is completed is referred to as a first elapsed time. When the vehicle apparatus 4 receives an instruction signal indicative of adjusting the parking position of the vehicle 2, and the elapsed time reaches a predetermined value (any one of the manual parking threshold value 43*a*, the automatic parking threshold value 43*b*, and the parking adjustment threshold value 43*c*, all of which will be described later), the tracking of time is stopped, and an amount of time measured up to that point is cleared (a measured time is set to zero). The tracking of time is re-started when the adjustment of a vehicle position is completed. The amount of time tracked when the adjustment of the position is completed is referred to as a second elapsed time. The tracking of time is preferably re-started when the adjustment of the vehicle position is completed rather than when an instruction signal is received. The reason for this is that a measured elapsed time is an amount of time required for the user to determine whether to adjust a vehicle position, and the user determines whether to adjust the vehicle position after the adjustment of the vehicle position is completed. The clock unit 41*b* acts as a clock.

The instruction receiving unit 41*c* receives an instruction signal transmitted from the mobile device 3 by the user outside the vehicle, the instruction signal being indicative of adjusting the parking position of the vehicle 2. The instruction receiving unit 41*c* recognizes the direction and the distance of adjustment of the parking position which are contained in the instruction signal. The instruction receiving unit 41*c* acts as a receiver.

The movement control unit 41*d* controls the vehicle moving apparatus 5 (to be described later) such that the parking position of the vehicle 2 is adjusted. For example, when the user transmits an instruction signal to the mobile device 3, the instruction signal indicating that the parking position of the vehicle 2 has to move forward by 10 centimeters, the movement control unit 41*d* controls the vehicle moving apparatus 5 such that the parking position of the vehicle 2 moves forward by 10 centimeters. That is, the vehicle moving apparatus 5 is controlled by the movement control unit 41*d* such that a transmission is set to a drive mode, a steering wheel is turned to a straight-ahead position, the engine is driven by electronic throttle control, and then braking is applied to stop the vehicle 2 when the vehicle 2 moves forward by 10 centimeters. The movement control unit 41*d* acts as a moving part.

When the elapsed time tracked by the clock unit 41*b* reaches the predetermined value (any one of the manual parking threshold value 43*a*, the automatic parking threshold value 43*b*, and the parking adjustment threshold value 43*c*, all of which will be described later), the adjustment prohibiting unit 41*e* prohibits the adjustment of a parking position. When the elapsed time reaches the predetermined value, the adjustment prohibiting unit 41*e* sets an adjustment prohibiting flag to "ON". The adjustment prohibiting flag is stored in the flag register of the control unit 41. Even if the movement control unit 41*d* receives an instruction signal indicative of adjusting a parking position, the movement control unit 41*d* does not adjust the parking position while the adjustment prohibiting flag is "ON". The adjustment prohibiting unit 41*e* acts as a prohibitor.

The automatic parking determination unit 41*f* determines whether the vehicle 2 is automatically parked. There are two types of parking operations: one is an operation in which the vehicle 2 is controlled to be automatically parked in a parking region, and the other is an operation in which the user parks the vehicle 2 in the parking region. The automatic parking determination unit 41*f* receives a control signal from an automatic parking apparatus 22 (to be described later), and sets an automatic parking flag to "ON" when the parking is completed. The automatic parking flag is stored in the flag register of the control unit 41. An "OFF" status of the automatic parking flag when the parking is completed indicates that the vehicle is manually parked by the user.

The vehicle moving apparatus 5 is an apparatus that is configured to realize automatic travelling by controlling a steering wheel 23, a throttle body 24, and a brake pedal 25 of the vehicle 2 and executing an adaptive cruise control (abbreviated name: ACC) or a lane keeping assist (abbreviated name: LKA). The vehicle moving apparatus 5 includes a steering control unit 51, a throttle control unit 52, and a brake control unit 53.

The steering control unit 51 is an electronic control apparatus configured to control the steering wheel 23 (to be described later). The steering control unit 51 controls a travel direction of the vehicle 2 by adjusting the angle of the steering wheel 23.

The throttle control unit 52 is an electronic control apparatus configured to control the electronic throttle body 24 (to be described later). The throttle control unit 52 controls an output (rotational speed) of the engine by adjusting a throttle opening based on the amount of acceleration pedal depression performed by the user. When a control target of the throttle control unit 52 is an electric motor, the throttle control unit 52 controls the rotational speed of the motor or a voltage to be applied to the electric motor.

The brake control unit 53 is an electronic control apparatus configured to control the brake pedal 25 (to be described later). The brake control unit 53 controls a braking force of the brake pedal 25 based on the amount of brake pedal depression performed by the user.

A transmission control unit 54 is an electronic control apparatus configured to control a transmission 26 (to be described later). The transmission control unit 54 controls switching between shift gears of the transmission 26, and switching between a drive position and a reverse position of the transmission 26 based on the position of a shift lever changed by the user.

The vehicle 2 includes an IG switch 21; the automatic parking apparatus 22; the steering wheel 23; the electronic throttle body 24; and the brake pedal 25 in addition to the vehicle apparatus 4 and the vehicle moving apparatus 5.

The IG switch 21 is a switch configured to wake up and stop the electrical system of the vehicle 2. When the IG switch 21 is turned on, the electrical system is woken up, and when the IG switch 21 is turned off, the electrical system is stopped. When the IG switch 21 is turned on, the IG switch 21 outputs an IG signal to the vehicle apparatus 4.

The automatic parking apparatus 22 is an electronic control apparatus configured to park the vehicle 2 in a desired parking region without a driving operation performed by the user. The automatic parking apparatus 22 recognizes the parking region using data acquired by a vehicle-mounted camera or a sensor (both are not illustrated), and parks the vehicle 2 in the parking region by controlling the steering wheel 23, the electronic throttle body 24, and the brake pedal 25 (all will be described later).

The steering wheel 23 is a steering apparatus configured to change the travel direction of the vehicle 2.

The electronic throttle body 24 is a control apparatus configured to control the driving of the vehicle 2 by electronically controlling an output of the engine (not illustrated), and forms a so-called drive by wire system along with the throttle control unit 52. The engine controlled by the electronic throttle body 24 is preferably an electric motor. The reason for this is that the electric motor does not require an ignition operation of the internal combustion engine, and the position of the vehicle 2 can be easily adjusted after parking is completed.

The brake pedal 25 is a brake apparatus configured to reduce the speed of the vehicle 2. The brake pedal 25 includes a parking brake pedal configured to stop the vehicle 2.

The transmission 26 is a transmission of the vehicle 2, changes a shift gear of the vehicle 2, and switches the forward driving to the rearward driving of the vehicle 2, and vice versa.

Figure 3:
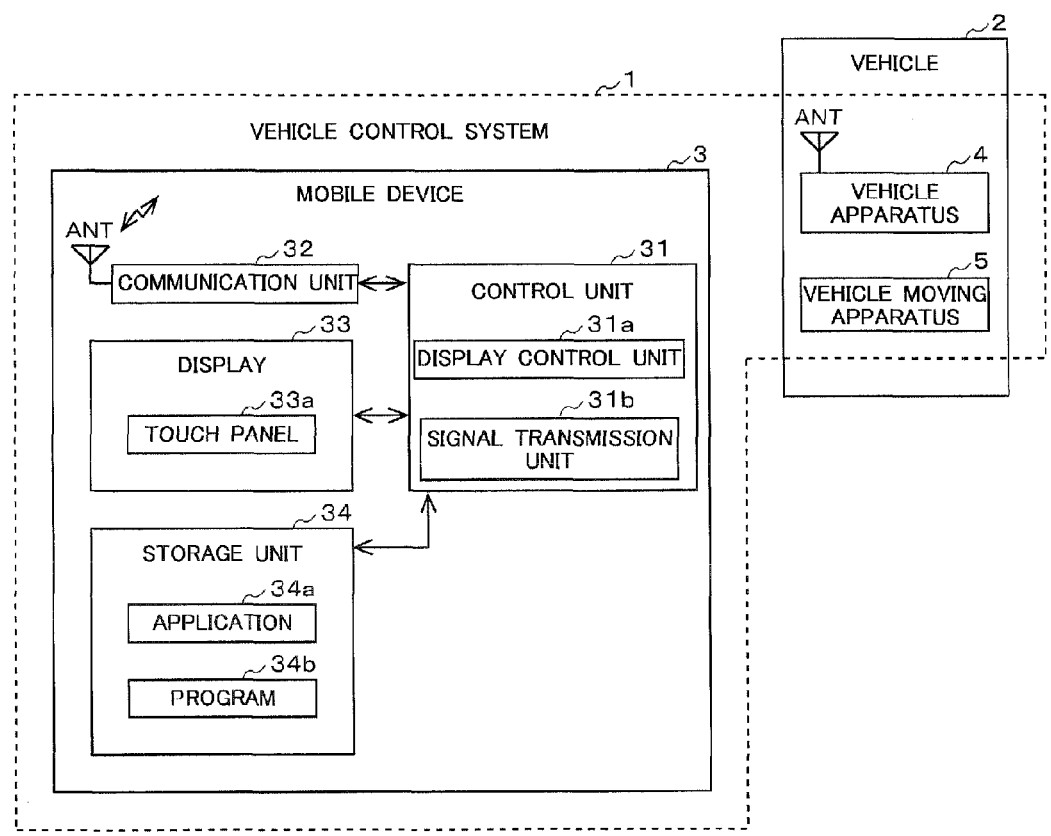
FIG. 3 illustrates a configuration of a mobile device.

Subsequently, the configuration of the mobile device 3 will be described. FIG. 3 illustrates the configuration of the mobile device 3. As described above, the mobile device 3 is a compact communication terminal held by the user. The mobile device 3 includes a control unit 31; a communication unit 32; a display 33; and a storage unit 34.

The control unit 31 is a microcomputer configured to include a CPU, a RAM, and a ROM. The control unit 31 controls the entirety of the mobile device 3. The control unit 31 includes a display control unit 31a and a signal transmission unit 31b.

The display control unit 31a displays data such as images or characters on the display 33 (to be described later). The display control unit 31a changes images or the like to be displayed on the display 33 based on the position of a touch that is input to a touch panel 33a (to be described later).

The signal transmission unit 31b controls the communication unit 32 (to be described later) such that an instruction signal is transmitted to the vehicle apparatus 4, the instruction signal indicating that the parking position of the vehicle 2 has to be adjusted. The instruction signal is input via the touch panel 33a by the user, and contains information regarding the direction and the distance of movement of the vehicle 2.

The communication unit 32 includes an antenna, and communicates wirelessly with the vehicle apparatus 4 using information communication technologies such as worldwide interoperability for microwave access (WiMAX) and long term evolution (LTE). The communication unit 32 transmits an instruction signal to the vehicle apparatus 4, the instruction signal being indicative of moving the vehicle 2.

The display 33 is a display apparatus that is configured to display various pieces of information such as characters or graphics, and to present visual information to the user of the mobile device 3. For example, the display 33 may be a liquid crystal display. The display 33 includes the touch panel 33a.

The touch panel 33a senses contact between the user and button regions on the display 33, and transmits sensed position information to the control unit 31.

The storage unit 34 is a non-volatile storage medium such as a hard disk drive configured to include an electrical erasable programmable read-only memory (EEPROM), a flash memory, or a magnetic disk. The storage unit 34 stores an application 34a and a program 34b.

The application 34a is application software configured to transmit an instruction signal from the mobile device 3, the instruction signal being indicative of adjusting the parking position of the vehicle 2. The application 34a is started when the mobile device 3 receives a parking completion signal transmitted from the vehicle apparatus 4, in addition to when the user operates a start-up switch. When the application 34a is started up, an operation window is displayed and receives inputs from the user, the inputs containing information regarding a direction and a distance in and by which a parking position has to be adjusted.

The program 34b is firmware that is read and executed to control the mobile device 3 by the control unit 31.

Figure 4:
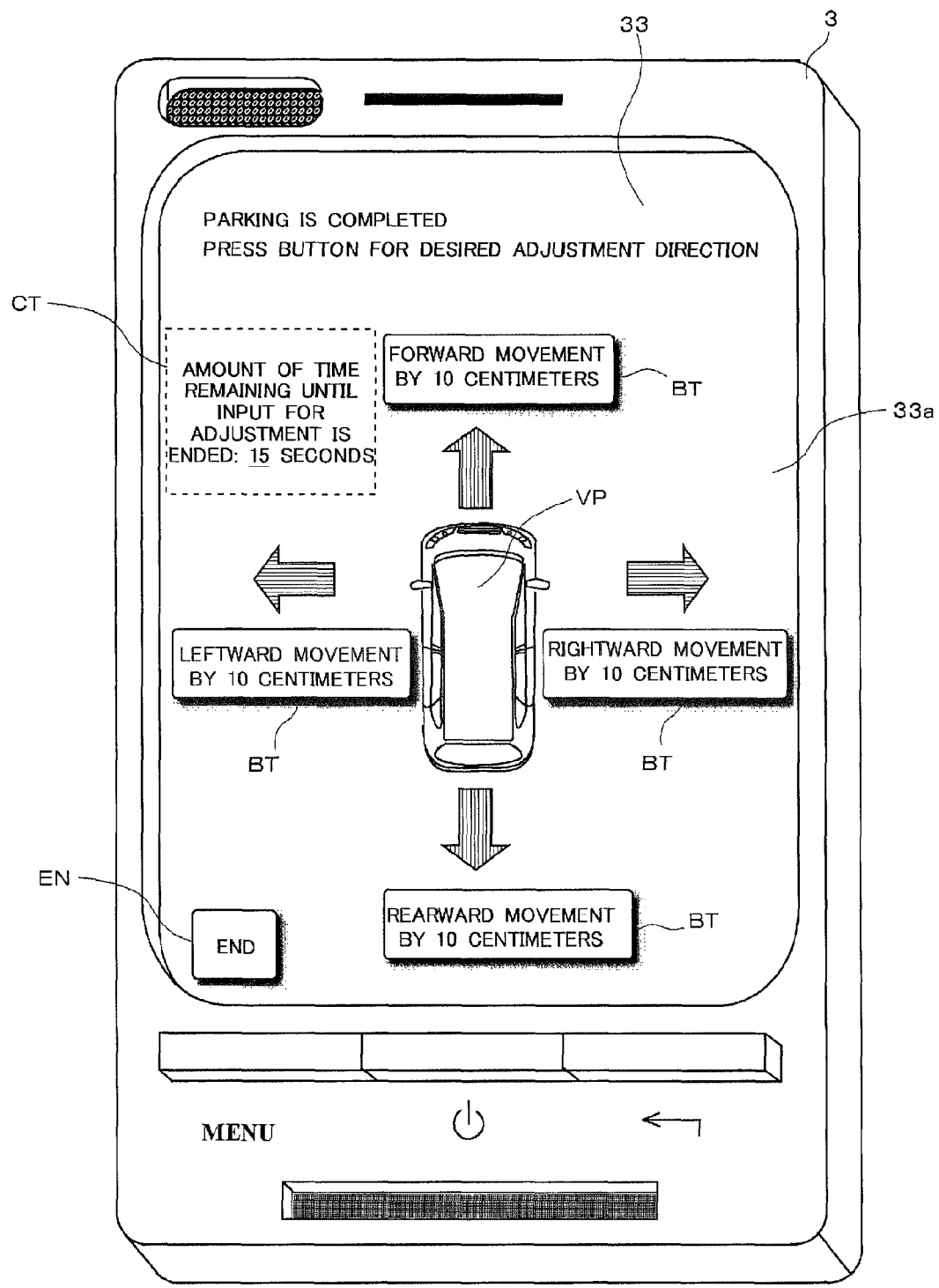
FIG. 4 illustrates an example of a display screen of the mobile device.

FIG. 4 is an example of an operation screen that is displayed on the display 33 of the mobile device 3, and receives inputs from the user, the inputs containing information regarding a direction and a distance in and by which a parking position has to be adjusted. The display 33 displays a vehicle image VP; direction/distance buttons BT; a remaining time display CT; and an end button EN. The direction/distance button BT and the end button EN correspond to the touch panel 33a. The user can input a desired operation by touching each of the buttons.

The vehicle image VP is a vehicle image when the vehicle is overlooked from the top, and is displayed at the center of the display 33.

The direction/distance buttons BT are displayed respectively to the front, back, right, and left of the vehicle image VP, and each of the direction/distance buttons BT indicates a direction and a distance in and by which a parking position has to be adjusted. The user can input a direction and a distance, in and by which the parking position has to be adjusted, by touching the buttons BT.

The remaining time display CT indicates a remaining amount of time that allows the user to be able to input adjustment of a parking position. A remaining amount of time displayed indicates an amount of time remaining until the adjustment of the parking position is prohibited. That is, the remaining time display CT indicates an amount of time remaining until an elapsed time tracked by the clock unit 41b after the completion of parking reaches a predetermined threshold value. Since the remaining time display CT is displayed using a countdown method, the user can always recognize a remaining amount of time that allows the user to be able to input adjustment of the parking position. In addition, the user can recognize the end of a remaining amount of time during which an input can be entered. For this reason, when an adjustment prohibiting process is performed by the vehicle apparatus while the necessity of adjustment of the parking position is being reviewed, the vehicle does not move even if there is an input of an operation, and thereby it is possible to prevent the user from misperceiving a non-movement of the vehicle as a malfunction of the mobile device 3 or the vehicle apparatus 4.

An application for adjustment of a parking position is ended via the end button EN. The user can end the application for adjustment of the parking position by operating the end button EN when the user does not desire to adjust the parking position. Since the touch panel 33a is not allowed to receive an operation input by the user after the application is ended, it is possible to prevent inputs from being erroneously entered, and to improve safety.

1-3. Process Steps

Figure 5:
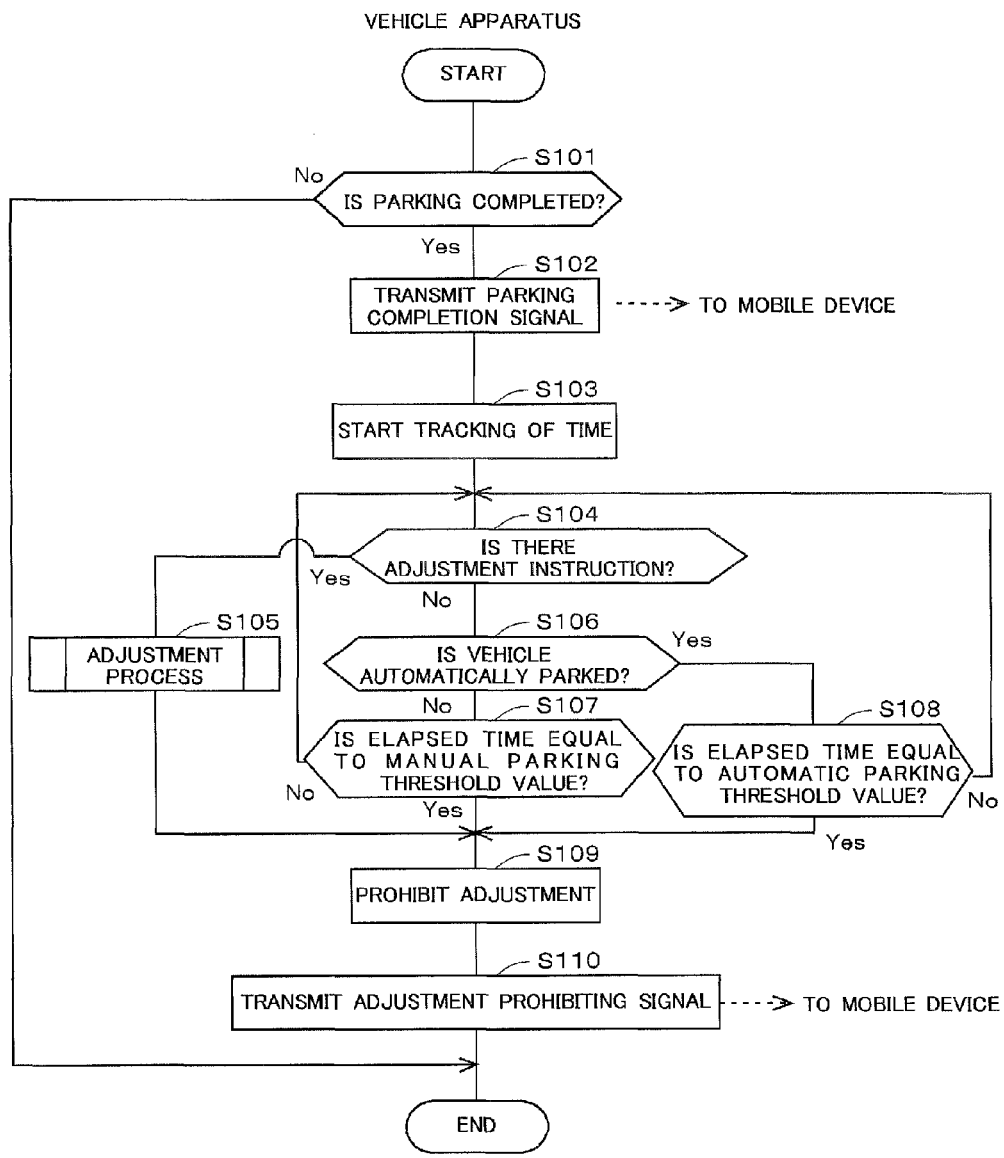
FIG. 5 illustrates process steps performed by the vehicle apparatus.
Figure 6:
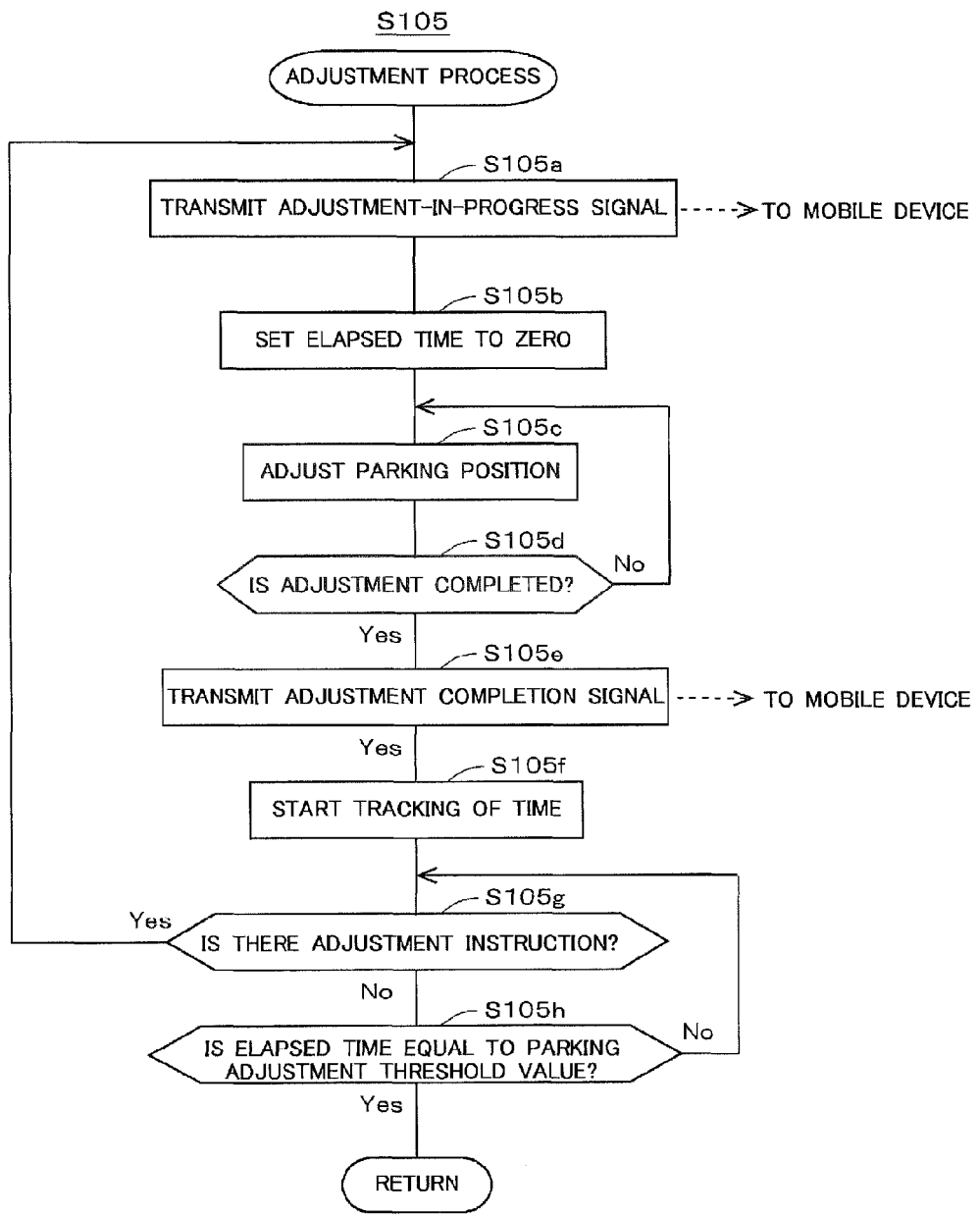
FIG. 6 illustrates process steps performed by the vehicle apparatus.

Process steps performed by the vehicle apparatus 4 will be described. FIGS. 5 and 6 indicate process steps performed by the vehicle apparatus 4. The process steps are repeatedly executed at a predetermined period.

First, the parking completion determination unit 41a of the vehicle apparatus 4 determines whether the parking of the vehicle 2 is completed (step S101). When the parking completion determination unit 41a detects an off state of an IG signal from the IG switch 21, the parking completion determination unit 41a determines that the parking is completed.

When the parking completion determination unit 41a determines that the parking of the vehicle 2 is not completed (No in step S101), the process ends. The reason for ending the process is that the incompletion of parking indicates that the vehicle 2 is being driven, and it is not necessary to adjust a parking position. In this case, the process is re-executed after a predetermined period elapses.

In contrast, when the parking completion determination unit 41a determines that the parking of the vehicle 2 is completed (Yes in step S101), the parking completion determination unit 41a transmits a parking completion signal to the mobile device 3, the parking completion signal being indicative of the completion of parking (step S102). When the parking completion signal is transmitted to the mobile device 3, the application 34a for adjustment of a parking position is started up. Accordingly, the user can input a direction and a distance in and by which the parking position has to be adjusted.

Subsequently, the clock unit 41b starts tracking an elapsed time (step S103).

The instruction receiving unit 41c determines whether there is an adjustment instruction indicative of adjusting the parking position of the vehicle 2 from the mobile device 3 (step S104). The instruction receiving unit 41c determines whether an adjustment instruction signal is received.

When the instruction receiving unit 41c determines that there is an instruction for adjustment of the parking position (Yes in step S104), the movement control unit 41d executes a process of adjusting the parking position of the vehicle 2 (step S105). The process of adjusting the parking position will be described later in detail.

When the instruction receiving unit 41c determines that there is no instruction for adjustment of the parking position (No in step S104), the automatic parking determination unit 41f determines whether the vehicle 2 is automatically parked (step S106).

When the automatic parking determination unit 41f determines that the vehicle 2 is not automatically parked, that is, the vehicle 2 is manually parked by the user (No in step S106), the clock unit 41b determines whether the elapsed time reaches the manual parking threshold value 43a (step S107).

When the clock unit 41b determines that the elapsed time reaches the manual parking threshold value 43a (Yes in step S107), the adjustment prohibiting unit 41e sets the adjustment prohibiting flag to "ON", and prohibits the adjustment of the parking position (step S109). After the adjustment prohibiting flag is set to "ON", the movement control unit 41d does not adjust the parking position of the vehicle 2 even if the instruction receiving unit 41c receives an instruction signal for adjustment of the position from the mobile device 3. Accordingly, even if the instruction signal for adjustment of the position is transmitted due to an erroneous operation performed by the user, the vehicle 2 is prevented from moving, and it is possible to improve the safety of the vehicle control system.

When the adjustment prohibiting unit 41e prohibits the adjustment of the parking position, the adjustment prohibiting unit 41e transmits an adjustment prohibiting signal to the mobile device 3, the adjustment prohibiting signal being indicative of prohibiting the adjustment of the parking position (step S110). When the mobile device 3 receives the adjustment prohibiting signal, the mobile device 3 displays a message on the display 33, the message indicating that the adjustment of the parking position is prohibited. When the adjustment of the parking position is prohibited, the vehicle 2 does not move even if an instruction indicative of adjustment of the parking position is transmitted, and thereby it is possible to prevent the user from misperceiving the non-movement of the vehicle as a malfunction of the vehicle control system 1 by recognizing the message indicating that the adjustment of the parking position is prohibited.

When the adjustment prohibiting unit 41e transmits the adjustment prohibiting signal to the mobile device 3, the process ends.

In contrast, when the clock unit 41b determines that the elapsed time does not reach the manual parking threshold value 43a (No in step S107), the process returns to step S104, and the instruction receiving unit 41c re-determines whether there is an adjustment instruction from the mobile device 3, the adjustment instruction being indicative of adjusting the parking position of the vehicle 2. Hereinafter, the aforementioned steps are executed.

In contrast, when the automatic parking determination unit 41f determines that the vehicle 2 is automatically parked (Yes in step S106), the clock unit 41b determines whether the elapsed time reaches the automatic parking threshold value 43b (step S108).

When the clock unit 41b determines that the elapsed time reaches the automatic parking threshold value 43b (Yes in step S108), the adjustment prohibiting unit 41e sets the adjustment prohibiting flag to "ON", the adjustment of the parking position is prohibited (step S109), and an adjustment prohibiting signal is transmitted (step S110). When the adjustment prohibiting signal is transmitted, the process ends.

In contrast, when the clock unit 41b determines that the elapsed time does not reach the automatic parking threshold value 43b (No in step S108), the process returns to step S104, and the aforementioned steps are executed.

Subsequently, the process of adjusting the parking position in step S105 will be described in detail. FIG. 6 illustrates details of the process of adjusting the parking position.

First, the movement control unit 41d transmits an adjustment-in-progress signal to the mobile device 3, the adjustment-in-progress signal indicating that the adjustment of the parking position is in progress (step S105a). When the mobile device 3 receives the adjustment-in-progress signal, the mobile device 3 displays a message on the display 33, the message indicating that the adjustment of the parking position is in progress. Accordingly, the user can recognize that the adjustment of the parking position is in progress. Since the vehicle 2 moves at a very low speed during the adjustment of the parking position, the user may not recognize that the adjustment of the parking position is in progress. The display of this message can prevent the user from repeatedly transmitting an unnecessary signal indicative of adjusting the parking position.

When the movement control unit 41d transmits the adjustment-in-progress signal, the clock unit 41b resets the measured elapsed time (step S105b). That is, the elapsed time, which is an addition of times, is set to zero.

When the clock unit 41b resets the measured elapsed time, the movement control unit 41d controls the vehicle moving apparatus 5 such that the parking position of the vehicle 2 is adjusted based on an adjustment instruction from the user (step S105c).

When the adjustment of the parking position of the vehicle 2 is started, the movement control unit 41d determines whether the adjustment is completed (step S105d). The movement control unit 41d can determine whether the adjustment is completed when the parking brake pedal is applied, when a time elapsed after the vehicle 2 is stopped reaches a predetermined time or longer, or the like.

When the movement control unit 41d determines that the adjustment is not completed (No in step S105d), step S105d is repeatedly executed until it is determined that the adjustment is completed.

In contrast, when the movement control unit 41d determines that the adjustment is completed (Yes in step S105d), the movement control unit 41d transmits an adjustment completion signal to the mobile device 3, the message indicating that the adjustment of the parking position is completed (step S105e). When the mobile device 3 receives the adjustment completion signal, the mobile device 3 displays a message on the display 33, the message indicating that the adjustment of the parking position is completed. Accordingly, the user can recognize that the adjustment of the parking position is completed, and thereby, the user can start determining whether the re-adjustment of the parking position is required.

When the movement control unit 41d transmits the adjustment completion signal, the clock unit 41b starts measuring an elapsed time (step S105f).

When the clock unit 41b starts measuring the elapsed time, the instruction receiving unit 41c determines whether there is an adjustment instruction from the mobile device 3, the adjustment instruction being indicative of adjusting the parking position of the vehicle 2 (step S105g).

When the instruction receiving unit 41c determines that there is an instruction indicative of adjusting the parking position (Yes in step S105g), the movement control unit 41d re-transmits an adjustment-in-progress signal (step S105a). Thereafter, the steps following step S105b are re-executed. When the user transmits a plurality of adjustment instructions, a group of steps made up of step S105a to step S105g are repeatedly executed, and the adjustment of the parking position is executed multiple times.

In contrast, when the instruction receiving unit 41c determines that there is no instruction indicative of adjusting the parking position (No in step S105g), the clock unit 41b determines whether the elapsed time reaches the parking adjustment threshold value 43c (step S105h).

When the clock unit 41b determines that the elapsed time does not reach the parking adjustment threshold value 43c (No in step S105h), the process returns to step S105g, and it is re-determined whether there is an adjustment instruction.

In contrast, when the clock unit 41b determines that the elapsed time reaches the parking adjustment threshold value 43c (Yes in step S105h), the process returns to step S109 and step S110 illustrated in FIG. 5, and step S109 and step S110 are executed. That is, the adjustment prohibiting unit 41e sets the adjustment prohibiting flag to "ON", and the adjustment of the parking position is prohibited (step S109), and an adjustment prohibiting signal is transmitted (step S110). When the adjustment prohibiting signal is transmitted, the process ends.

1-4. Progress of Process

Figure 7:
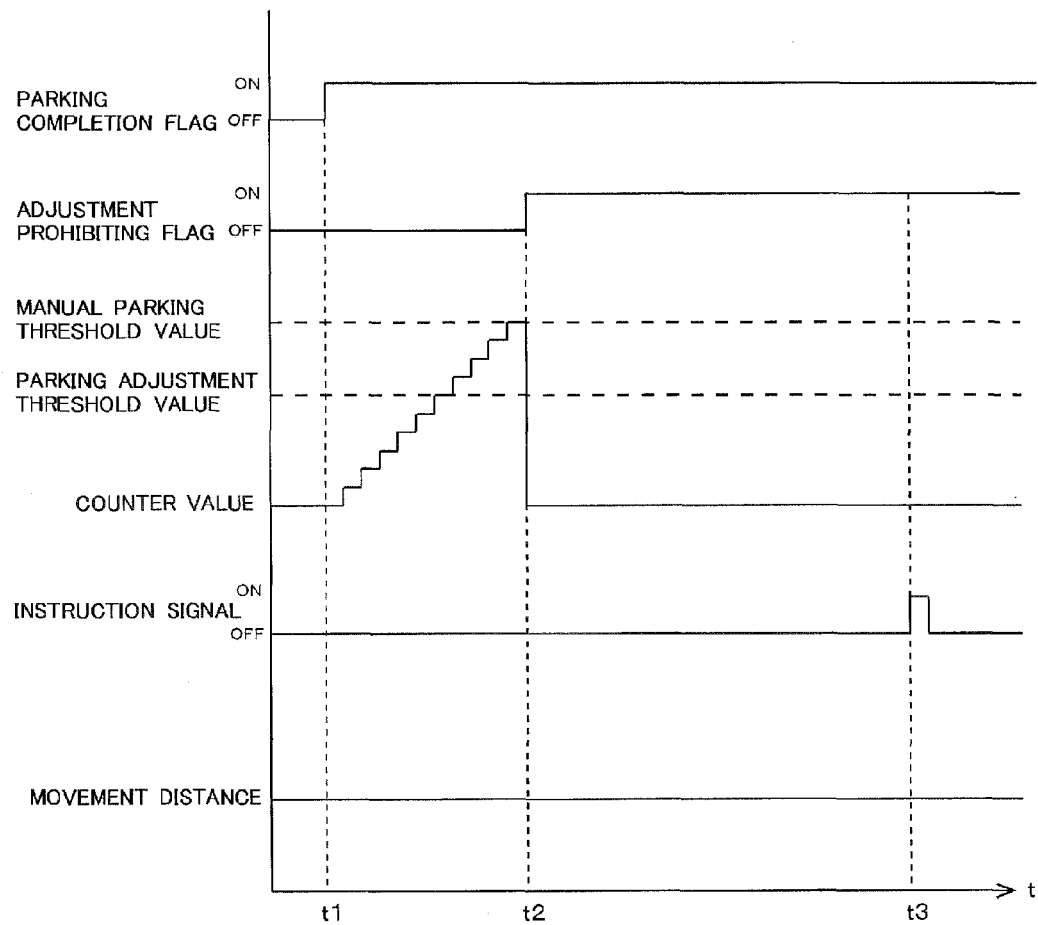
FIG. 7 illustrates the progress of a process over time performed by the vehicle apparatus.
Figure 8:
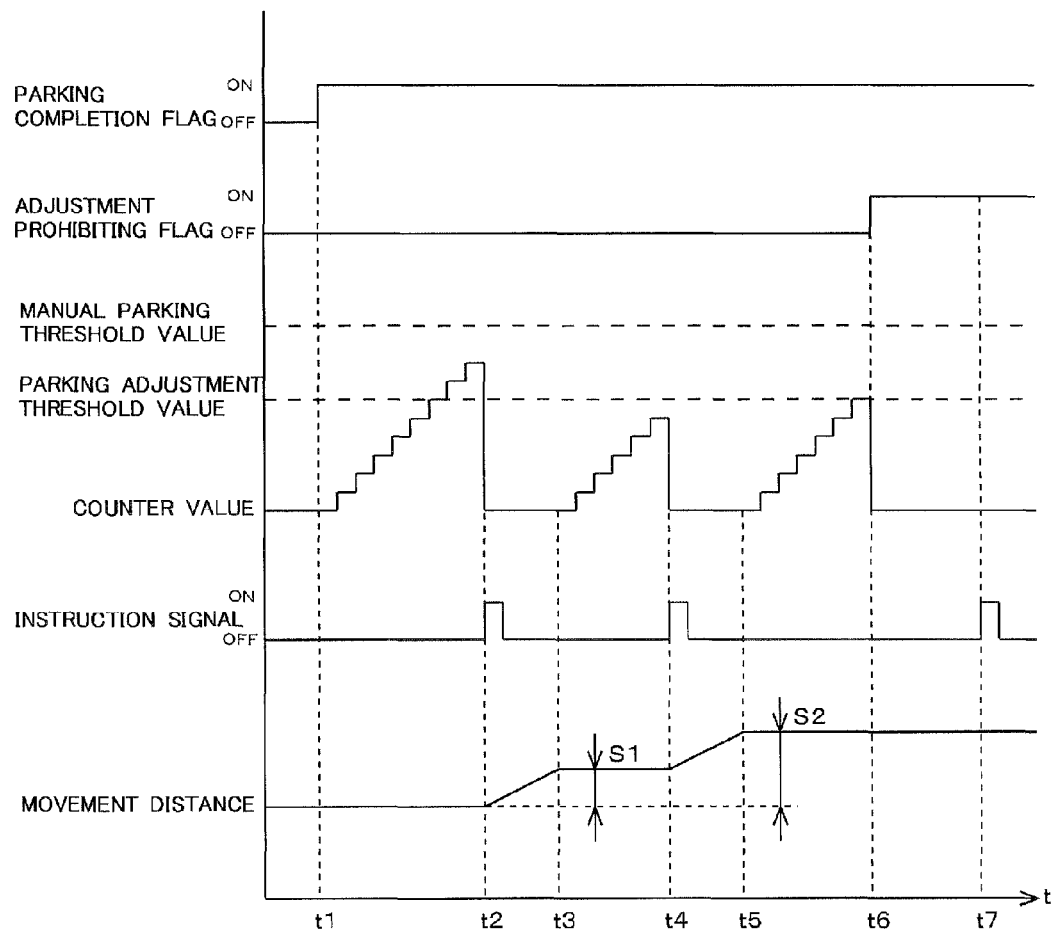
FIG. 8 illustrates the progress of a process over time performed by the vehicle apparatus.

The progress of a process performed by the vehicle control system 1 will be described. FIGS. 7 and 8 are timing charts illustrating the progress of the process performed by the vehicle control system 1 over time.

FIG. 7 illustrates the progress of the process performed by the vehicle control system 1 when an instruction signal indicative of adjusting a parking position is not transmitted until a time elapsed after the completion of parking of the vehicle 2 by the user reaches a predetermined value.

First, at time t1, the parking of the vehicle 2 is completed, and the parking completion flag is set to "ON". When the parking completion flag is set to "ON", the clock unit 41b starts measuring an elapsed time, and adds counter values, which becomes the elapsed time. Since the user by himself drives the vehicle 2 such that the parking of the vehicle 2 is completed (that is, the vehicle 2 is not automatically parked), it is determined whether a counter value reaches the manual parking threshold value 43a.

At time t2 shortly thereafter, when the counter value reaches the manual parking threshold value 43a in a state where an instruction signal indicative of adjusting a parking position is not transmitted, the counter value is reset, and the adjustment prohibiting flag for the parking position is set to "ON". Since the adjustment prohibiting flag is set to "ON", the parking position is not adjusted even if an instruction signal indicative of adjusting the parking position is transmitted.

Time t3 indicates a time when the user erroneously operates the mobile device 3 and transmits an instruction signal. Since the adjustment prohibiting flag is already set to "ON" at time t3, the parking position is not adjusted, and the vehicle does not move.

FIG. 8 illustrates the progress of the process performed by the vehicle control system 1 when an instruction signal indicative of adjusting a parking position is transmitted 2 times until a time elapsed after the completion of parking of the vehicle 2 by the user reaches the predetermined value.

First, at time t1, the parking of the vehicle 2 is completed, and the parking completion flag is set to "ON". When the parking completion flag is set to "ON", the clock unit 41*b* starts measuring an elapsed time, and adds counter values, which becomes the elapsed time. Since the user by himself drives the vehicle 2 such that the parking of the vehicle 2 is completed (that is, the vehicle 2 is not automatically parked), it is determined whether a counter value reaches the manual parking threshold value 43*a*.

At time t2, an instruction signal indicative of adjusting the parking position is transmitted before the counter value reaches the manual parking threshold value 43*a*. When the instruction signal is transmitted, the counter value is reset, and the adjustment of the parking position is started.

At time t3, the adjustment of the parking position is completed, and the movement distance of the vehicle 2 is equal to a movement distance S1. When the adjustment of the parking position is completed, the clock unit 41*b* restarts measuring an elapsed time, counter values are added. Since the parking position is adjusted at this time, it is determined whether a counter value reaches the parking adjustment threshold value 43*c*.

At time t4, an instruction signal indicative of adjusting the parking position is transmitted before the counter value reaches the parking adjustment threshold value 43*c*. When the instruction signal is transmitted, the counter value is reset, and the adjustment of the parking position is started.

At time t5, the adjustment of the parking position is completed, and the movement distance of the vehicle 2 is equal to a movement distance S2. When the adjustment of the parking position is completed, the clock unit 41*b* restarts measuring an elapsed time, and counter values are added.

At time t6 shortly thereafter, when the counter value reaches the parking adjustment threshold value 43*c* in a state where an instruction signal indicative of adjusting the parking position is not transmitted, the counter value is reset, and the adjustment prohibiting flag for the parking position is set to "ON".

Time t7 indicates a time when the user erroneously operates the mobile device 3 and transmits an instruction signal. Since the adjustment prohibiting flag is already set to "ON" at time t3, the parking position is not adjusted, and the vehicle does not move.

As described above, in the first embodiment of the present invention, when a time elapsed after the completion of parking reaches a predetermined time, the adjustment of a parking position based on an instruction from the user outside the vehicle is prohibited. Accordingly, even if the time elapsed after the completion of parking reaches the predetermined time, and then an adjustment instruction is erroneously output, it is possible to prevent the vehicle from moving out of the parking position, and to improve safety. Even if a driver does not issue an adjustment instruction after de-boarding the vehicle, the adjustment of the parking position is prohibited when the time elapsed after the completion of parking reaches the predetermined time, and thereby, the vehicle does not move, and safety is improved even if the user erroneously operates the remote control.

1-5. Modification Example of First Embodiment

The first embodiment has been described up to this point; however, the present invention is not limited to the first embodiment, and can be modified. Hereinafter, a modification example will be described. The aforementioned embodiment and embodiments to be described hereinbelow can be appropriately combined.

In the first embodiment, it is determined that parking is completed when the IG switch is turned off; however, it may be determined that parking is completed when the IG switch is turned off, and the closing of a door is detected after the door is opened. The state of the door may be acquired from a body ECU.

In the first embodiment, it is determined whether the user is present outside the vehicle, depending on whether the vehicle is automatically driven; however, a seat sensor may be provided, it may be determined whether the user is present outside the vehicle based on an input from the seat sensor, and a time, which is a threshold value, may be changed based on a determination result. That is, when the seat sensor is active, it is determined that the user is outside the vehicle, and the threshold value may be reduced, and in contrast, when the seat sensor is inactive, it is determined that the user is in the vehicle, and the threshold value may be extended.

In the first embodiment, the tracking of time is started when the adjustment of the position of the vehicle is completed; however, the tracking of time may be started when an instruction signal for adjustment of the position is received. In this case, the threshold value may be set to include a time consumed to adjust the position of the vehicle.

In the first embodiment, a counter value is cleared when an elapsed time reaches a predetermined time; however, the counter value may be cleared when the elapsed time exceeds the predetermined time.

In the first embodiment, the clock unit 41*b* determines whether an elapsed time reaches a predetermined value; however, it may be determined that the elapsed time reaches the predetermined value when an initial time measurement is carried out after the elapsed time reaches the predetermined value. That is, the elapsed time is determined to reach the predetermined value immediately after the elapsed time exceeds the predetermined value.

In the first embodiment, the mobile device 3 may further include a microphone, and the user may issue an instruction indicative of adjusting a parking position via voice. For example, the user may input a voice message such as "moving the vehicle forward a little more" to the mobile device 3, and the vehicle apparatus 4 may move the vehicle 2 forward by 10 centimeters. In this case, the user can instinctively move the vehicle 2 while watching the parking position of the vehicle without referring to the display of the mobile device 3.

In the first embodiment, an instruction signal may be input multiple consecutive times. A parking position may be adjusted corresponding to a combination of the content of a plurality of instructions. For example, when an instruction signal indicative of moving the vehicle forward by 10 centimeters is input five consecutive times, the vehicle is controlled to move forward by 50 centimeters, which is a sum of 10 cm. forward movements. When an instruction signal indicative of moving the vehicle forward by 10 centimeters is input three consecutive times, and an instruction signal indicative of moving the vehicle rearward by 10 centimeters two consecutive times, the vehicle is controlled to move forward by 10 centimeters, which is a balance between forward movements and rearward movements.

In the first embodiment, a movement direction and a movement distance in forward, rearward, rightward, and leftward directions are instructed by tapping (pressing the touch panel with a finger) the buttons displayed on the display 33 of the mobile device 3. However, the movement direction and the movement distance may be instructed using another type of operation. The other type of operation may be a so-called swipe operation (swiping a finger in a certain direction while pressing the touch panel). That is, the movement direction and the movement distance of the vehicle 2 may be instructed by the swiping of a finger on the touch panel 33*a*, and the movement direction and the movement distance of the finger on the touch panel 33*a*.

While the vehicle 2 is moving for adjustment of the parking position, a speaker (not illustrated) may issue a warning sound. In this case, it is possible to warn the user, pedestrians in the vicinity of the vehicle 2, and the like that the vehicle 2 is moving, and therefore, it is possible to improve safety. Preferably, the warning sound is continuously issued from before a start of the movement. The reason for this is that it is possible to further improve safety by forewarning persons in the vicinity of the vehicle 2 to start moving.

In the first embodiment, the vehicle control system 1 is mounted in a vehicle, and the vehicle may be transportation equipment including a two wheeler, a railroad vehicle, an airplane, a ship, and the like in addition to an automobile. The vehicle includes a military purpose vehicle in addition to a civilian purpose vehicle, and includes a commercial purpose vehicle in addition to a private vehicle. The vehicle control system 1 may be installed not only in a vehicle but also in a lifting machine such as an elevator or an escalator. In summary, the vehicle control system 1 may be installed in equipment that requires a delicate position adjustment.

2. Second Embodiment 2-1. Outline

Hereinafter, a second embodiment of the present invention will be described with reference to the accompanying drawings.

Figure 9:
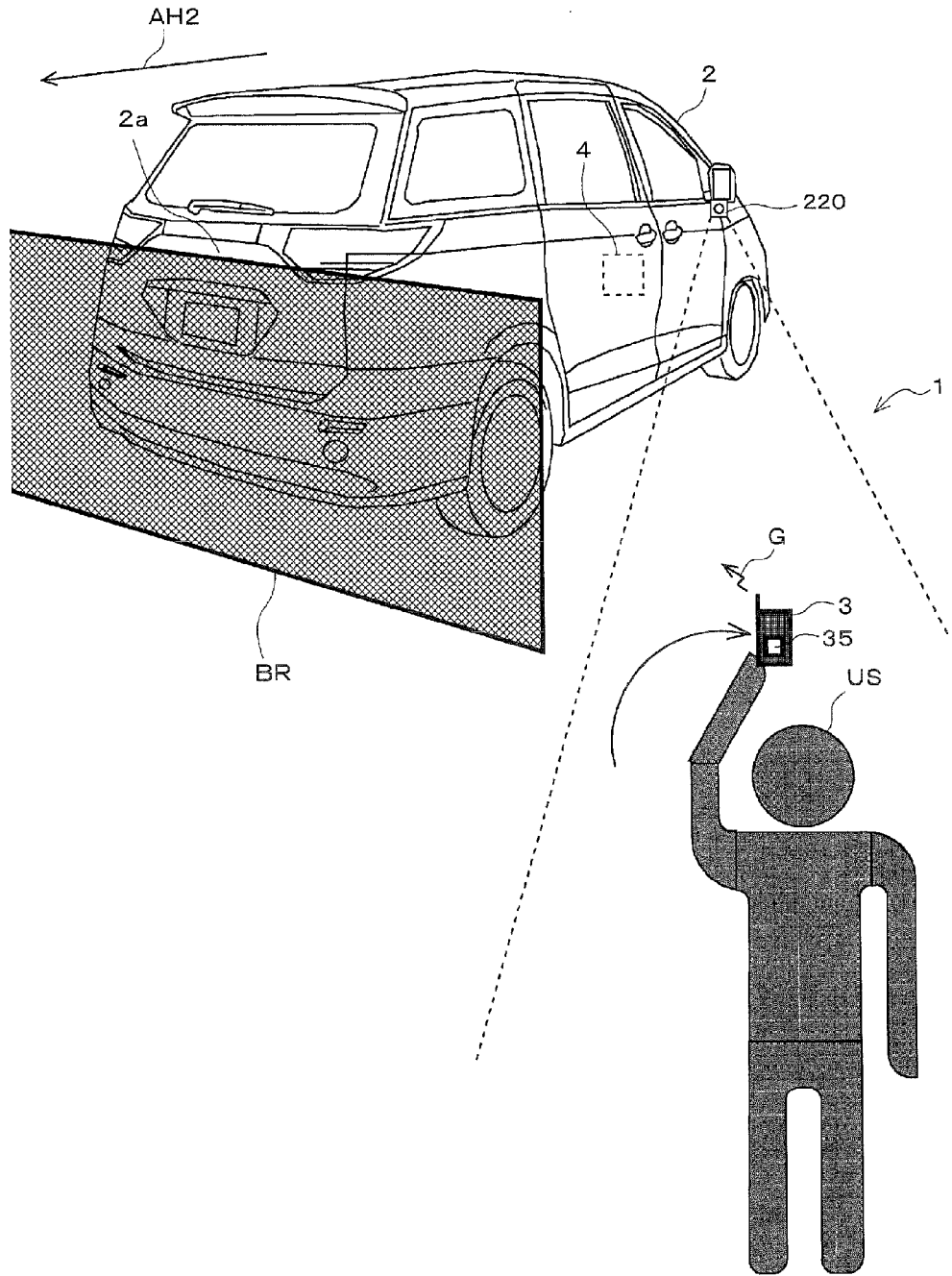
FIG. 9 illustrates an outline of a vehicle system.

FIG. 9 illustrates a mode in which the user (mainly a driver) US controls the vehicle control system 1 from outside the vehicle such that the vehicle 2 moves rearward, and is parked.

The user US by himself may not be able to park the vehicle 2 in a desired parking region. For example, the user US may park the vehicle 2 too close to the obstacle BR such as a fence partitioning off the parking region, and thereby, the user US may not be able to open a vehicle door such as the rear gate 2*a*, or the vehicle front end portion may jut out over the parking region, and thereby, the vehicle 2 may become an obstacle to parking other vehicles. In this case, it is necessary for the user to re-board the vehicle, and to adjust the parking position. However, the user US requires skill when driving the vehicle for delicate adjustment of the parking position while seeing surrounding objects through a mirror or the like, and an unskillful user may have to re-adjust the parking position while going back and forth between a driver's seat and outside the vehicle several times.

In the vehicle control system 1, the user US issues an instruction for a movement direction via a motion (gesture) while confirming the distance between the vehicle 2 and the obstacle BR from outside the vehicle, the obstacle BR partitioning off the parking region, and the vehicle 2 moves automatically in the instructed direction. In this time, the user holds the mobile device 3 with a built-in acceleration sensor 35, and issues an instruction via a motion of the hand holding the mobile device 3. The acceleration sensor 35 detects acceleration, and the mobile device 3 transmits acceleration data G to the vehicle apparatus 4. The vehicle apparatus 4 recognizes a movement direction of the mobile device 3, that is, a movement of direction of the user's hand holding the mobile device 3, based on the acceleration data G.

In addition, the vehicle apparatus 4 recognizes a motion of the user US by detecting the motion of the user US using a vehicle-mounted camera 220. When an instruction given by the hand of the user US and indicated by the acceleration data G coincides with an instruction given by the user US and indicated by image data, the vehicle apparatus 4 moves the vehicle in a direction AH2 instructed by the user US.

Accordingly, the user US can control the parking of the vehicle 2 while confirming the position of the vehicle 2 from outside the vehicle, and it is possible to increase convenience in parking the vehicle 2 without going back and forth between the driver's seat and outside the vehicle multiple times and re-performing a delicate driving operation while seeing surrounding objects through a mirror or the like.

When the position of the vehicle-mounted camera 220 changes with the movement of the vehicle 2, and thus the user US may stray out of the imaging range of the vehicle-mounted camera 220 unexpectedly, or may face the vehicle obliquely, an instruction given by the hand of the user US and indicated by the acceleration data G does not coincide with an instruction given by the user US and indicated by image data. Accordingly, the vehicle apparatus 4 does not erroneously detect an instruction given by the user US. As a result, it is possible to more reliably prevent the vehicle 2 from moving in a different direction that does not correspond to an intention of the user US compared to when an instruction from the user US is recognized based on only the image data.

2-2. Configuration

Figure 10:
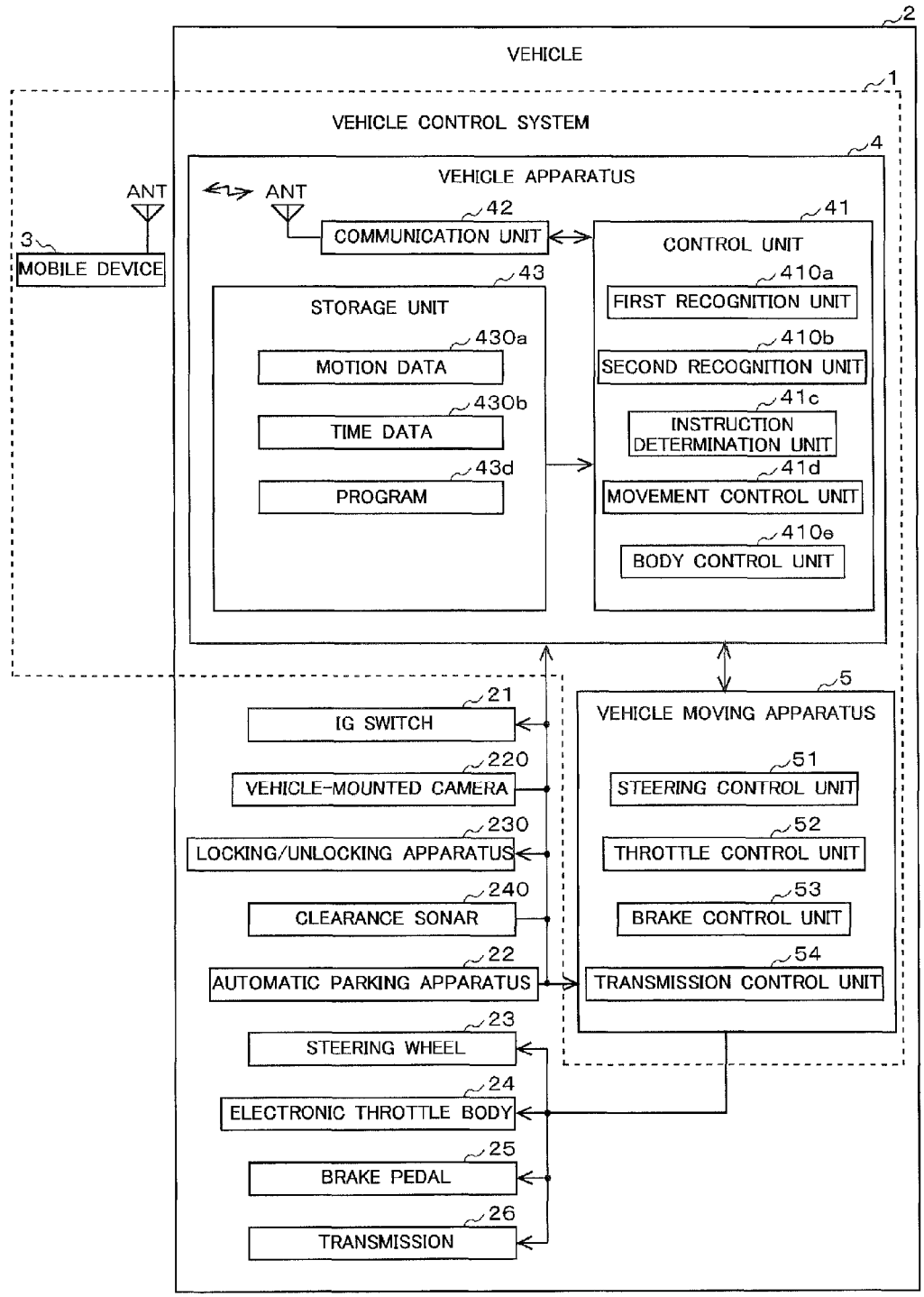
FIG. 10 illustrates a configuration of a vehicle apparatus and a vehicle moving apparatus.

FIG. 10 illustrates a configuration of the vehicle control system 1. The vehicle control system 1 includes the mobile device 3, the vehicle apparatus 4, and the vehicle moving apparatus 5. FIG. 10 illustrates a configuration of the vehicle apparatus 4 and the vehicle moving apparatus 5 of the vehicle control system 1.

The vehicle apparatus 4 is an electronic control apparatus that is disposed in the vehicle 2 and controlled by a microcomputer. The vehicle apparatus 4 communicates wirelessly with the mobile device 3, and controls the vehicle moving apparatus 5 in response to an instruction signal from the mobile device 3 such that the parking of the vehicle 2 is controlled. The vehicle apparatus 4 includes the control unit 41, the communication unit 42, and the storage unit 43.

The control unit 41 is a microcomputer configured to include a CPU, a RAM, and a ROM. The control unit 41 controls the entirety of the vehicle apparatus 4. The function of the control unit 41 will be described later.

The communication unit 42 includes an antenna, and communicates wirelessly with the mobile device 3 using information communication technologies such as worldwide interoperability for microwave access (WiMAX) and long term evolution (LTE). The communication unit 42 receives acceleration data or a signal indicative of the starting and the ending of a parking control apparatus of the vehicle 2 from the mobile device 3.

The storage unit 43 is a storage medium configured to store data. The storage unit 43 is a non-volatile memory such as a hard disk drive configured to include an electrical erasable programmable read-only memory (EEPROM), a flash memory, or a magnetic disk. The storage unit 43 stores motion data 430*a*, time data 430*b*, and the program 43*d*.

The motion data 430*a* is a data table in which data groups, for example, a "movement instruction indicated by a motion of the user", "major acceleration of the mobile device", and an "image of the user captured by the vehicle-mounted camera", are tabulated while being associated therewith. The content of the motion data 430*a* will be described in detail later.

The time data 430*b* is numeric data relating to time. For example, the numeric data may be 0.5 seconds. The time data 430*b* is a predetermined time indicating a difference between an amount of time required to recognize a motion of the user US based on the acceleration data, and an amount of time required to recognize a motion of the user US based on the image data. Since a technique of processing the acceleration data is different from a technique of processing the image data, a time difference in recognizing a motion of the user US occurs. If there is a difference between an amount of time required to recognize a motion of the user US based on the acceleration data, and an amount of time required to recognize a motion of the user US based on the image data, but the time difference is less than the predetermined time illustrated in the time data 430*b*, it is possible to assume that the instructions are acquired based on the same motion of the user.

The program 43*d* is firmware that is read and executed to control the vehicle apparatus 4 by the control unit 41.

The function of the control unit 41 will be described. The control unit 41 includes a first recognition unit 410*a*; a second recognition unit 410*b*; an instruction determination unit 410*c*; the movement control unit 41*d*; and a body control unit 410*e*.

The first recognition unit 410*a* detects the mode of major acceleration of the mobile device 3, which is indicated by the acceleration data transmitted from the mobile device 3, and, with reference to the motion data 430*a*, the first recognition unit 410*a* recognizes a movement instruction indicated by the motion of the user associated with the mode of acceleration. The first recognition unit 410*a* stores a recognized result in the RAM. The first recognition unit 410*a* acts as a first recognition part.

The mode of major acceleration of the mobile device 3 is the maximum acceleration of the mobile device 3, and contains information regarding an acceleration direction. The user cannot move the mobile device 3 in only one direction all the time, and it is necessary for the user to move the mobile device 3 in the opposite direction such that the mobile device 3 is returned to a start position thereof. Since minor acceleration occurs when the mobile device 3 is returned to the start position, this acceleration is removed as noise.

The second recognition unit 410*b* detects a motion of the user US indicated by the image data transmitted from the vehicle-mounted camera 220, and, with reference to the motion data 430*a*, the second recognition unit 410*b* recognizes a movement instruction indicated by the motion of the user associated with the image of the user US. The second recognition unit 410*b* stores a recognized result in the RAM. A known pattern matching technique may be used so as to recognize the image data. The second recognition unit 410*b* acts as a second recognition part.

With reference to the recognized results stored in the RAM by the first recognition unit 410*a* and the second recognition unit 410*b*, the instruction determination unit 410*c* determines whether both the movement instructions coincide with each other, both the movement instructions being indicated by the motion of the user recognized by both the recognition units.

The movement control unit 41*d* controls the vehicle moving apparatus 5 (to be described later) such that the parking position of the vehicle 2 is adjusted. For example, when the user issues an instruction to the mobile device 3, the instruction indicating that the vehicle 2 has to move forward, the movement control unit 41*d* controls the vehicle moving apparatus 5 such that the vehicle 2 moves forward. That is, the vehicle moving apparatus 5 is controlled by the movement control unit 41*d* such that the transmission is set to a drive position, the steering wheel is turned to a straight-ahead position, the engine is driven by the electronic throttle body, and thus the vehicle 2 moves forward. The movement control unit 41*d* acts as a moving part.

The body control unit 410*e* controls a locking/unlocking apparatus 230 (to be described later) such that doors of the vehicle 2 are locked.

The vehicle moving apparatus 5 is an apparatus that is configured to realize automatic travelling by controlling the steering wheel, the throttle body, the brake pedal, and the like of the vehicle 2 and executing an adaptive cruise control (abbreviated name: ACC) or a lane keeping assist (abbreviated name: LKA). The vehicle moving apparatus 5 includes the steering control unit 51, the throttle control unit 52, and the brake control unit 53.

The steering control unit 51 is an electronic control apparatus configured to control the steering wheel 23 (to be described later). The steering control unit 51 performs a control process such that the angle of the steering wheel 23 is adjusted, and a travel direction of the vehicle 2 is changed.

The throttle control unit 52 is an electronic control apparatus configured to control the electronic throttle body 24 (to be described later). The throttle control unit 52 controls an output (rotational speed) of the engine by adjusting a throttle opening based on the amount of acceleration pedal depression performed by the user. When a control target of the throttle control unit 52 is an electric motor, the throttle control unit 52 controls the rotational speed of the motor or a voltage to be applied to the electric motor.

The brake control unit 53 is an electronic control apparatus configured to control the brake pedal 25 (to be described later). The brake control unit 53 controls a braking force of the brake pedal 25 based on the amount of brake pedal depression performed by the user.

The transmission control unit 54 is an electronic control apparatus configured to control the transmission 26 (to be described later). The transmission control unit 54 controls switching between shift gears of the transmission 26, or switching between a drive position and a reverse position of the transmission 26 based on the position of the shift lever changed by the user.

The vehicle 2 includes the IG switch 21; the vehicle-mounted camera 220; the locking/unlocking apparatus 230; a clearance sonar 240; the automatic parking apparatus 22; the steering wheel 23; the electronic throttle body 24; the brake pedal 25; and the transmission 26 in addition to the vehicle apparatus 4 and the vehicle moving apparatus 5.

The IG switch 21 is a switch configured to wake up and stop the electrical system of the vehicle 2. When the IG switch 21 is turned on, the electrical system is woken up, and when the IG switch 21 is turned off, the electrical system is stopped. When the IG switch 21 is turned on, the IG switch 21 outputs an IG signal to the vehicle apparatus 4.

The vehicle-mounted cameras 220 are attached respectively to a front end and a rear end of the vehicle 2, and lower portions of right and left sideview mirrors, and capture images of the vicinity of the vehicle 2. While the IG switch 21 is turned on, the vehicle-mounted camera 220 captures images of the vicinity of the vehicle 2 all the time, and continuously transmits image data to the vehicle apparatus 4. The vehicle-mounted camera 220 acts as a detector, and the image data acts as a detected result obtained by the detector.

The locking/unlocking apparatus 230 is an apparatus configured to lock and unlock the doors of the vehicle 2.

The clearance sonar 240 is a sensor that is installed in an exterior body of the vehicle 2, and is configured to emit sound waves and to detect whether there is an obstacle in the vicinity of the vehicle 2. When the clearance sonar 240 detects an obstacle, the clearance sonar 240 transmits a detection signal to the vehicle apparatus 4.

The automatic parking apparatus 22 is an electronic control apparatus configured to park the vehicle 2 in a desired parking region without a driving operation performed by the user US. The automatic parking apparatus 22 recognizes the parking region using data acquired by the vehicle-mounted cameras 220 or a sensor (not illustrated), and parks the vehicle 2 in the parking region by controlling the steering wheel 23, the electronic throttle body 24, and the brake pedal 25 (all will be described later).

The steering wheel 23 is a steering apparatus configured to change the travel direction of the vehicle 2.

The electronic throttle body 24 is a control apparatus configured to control the driving of the vehicle 2 by electronically controlling an output of the engine (not illustrated). The electronic throttle body 24 forms a so-called drive by wire system along with the throttle control unit 52.

The brake pedal 25 is a brake apparatus configured to reduce the speed of the vehicle 2. The brake pedal 25 includes a parking brake pedal configured to stop the vehicle 2.

The transmission 26 is a transmission of the vehicle 2, which is configured to change a shift gear of the vehicle 2, and to switch the forward driving to the rearward driving of the vehicle 2, and vice versa.

Figure 11:
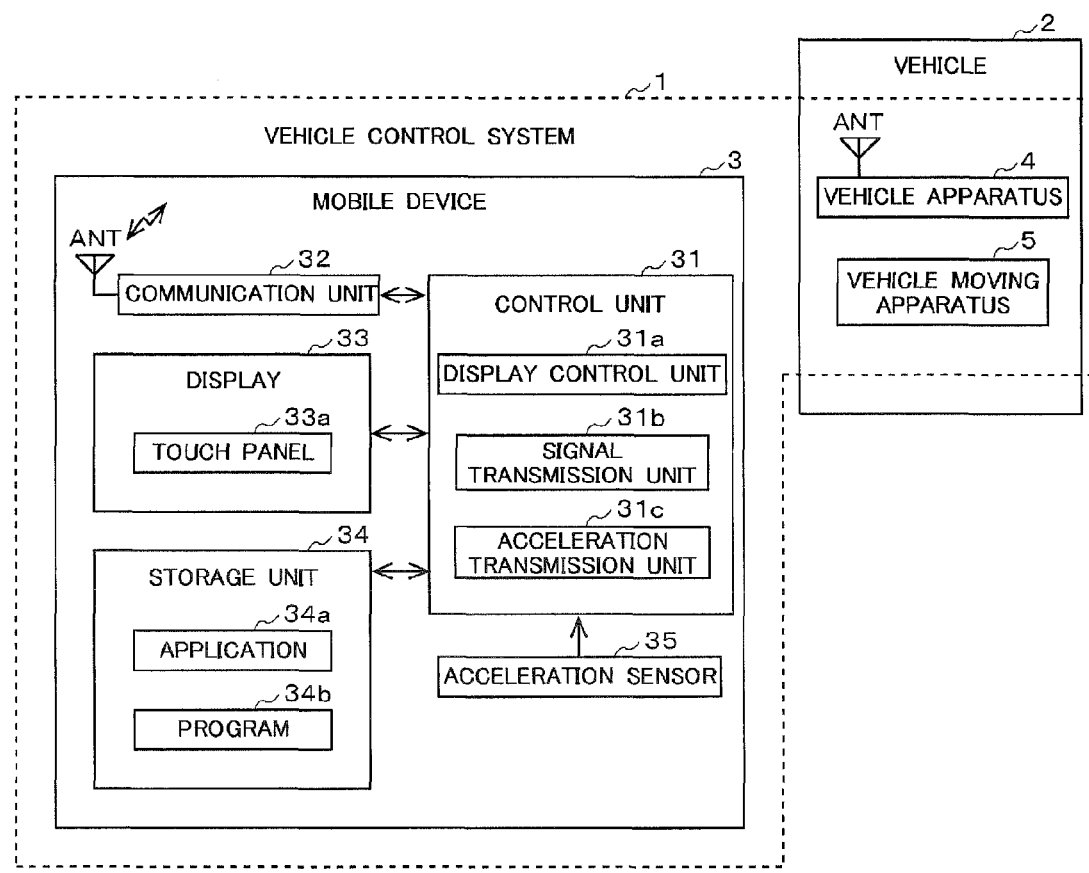
FIG. 11 illustrates a configuration of a mobile device.

FIG. 11 illustrates a configuration of the mobile device 3. The mobile device 3 is a compact communication terminal held by the user. For example, the mobile device 3 may be a mobile phone, a smartphone, a wristwatch, or an electronic vehicle key. The mobile device 3 is carried by the user and is moved in association with a motion of the body of the moving user. In summary, the mobile device 3 is held by the hand of the user, and is moved by the motion of the hand. The mobile device 3 includes the control unit 31; the communication unit 32; the display 33; the storage unit 34; and the acceleration sensor 35.

The control unit 31 is a microcomputer configured to include a CPU, a RAM, and a ROM. The control unit 31 controls the entirety of the mobile device 3. The function of the control unit 31 will be described later.

The communication unit 32 includes an antenna, and communicates wirelessly with the vehicle apparatus 4 using information communication technologies such as worldwide interoperability for microwave access (WiMAX) and long term evolution (LTE). The communication unit 32 transmits an instruction signal to the vehicle apparatus 4, the instruction signal being indicative of moving the vehicle 2.

The display 33 is a display apparatus that is configured to display various pieces of information such as characters or graphics, and to present visual information to the user of the mobile device 3. For example, the display 33 may be a liquid crystal display. The display 33 includes the touch panel 33a.

The touch panel 33a senses contact between the user and the button regions on the display 33, and transmits sensed position information to the control unit 31.

The storage unit 34 is a non-volatile storage medium such as a hard disk drive configured to include an electrical erasable programmable read-only memory (EEPROM), a flash memory, or a magnetic disk. The storage unit 34 stores the application 34a and the program 34b.

The application 34a is application software configured to transmit acceleration data from the mobile device 3. The application 34a is started up when the user operates a start-up switch. When the application 34a is started up, a message regarding how to use the device is displayed on the display 33, acceleration is detected, and acceleration data is transmitted.

The program 34b is firmware that is read and executed to control the mobile device 3 by the control unit 31.

The acceleration sensor 35 is a sensor configured to measure the acceleration (acceleration of the terminal) of the mobile device 3. For example, the acceleration sensor 35 may be an electrostatic capacitance type 3-axis acceleration sensor or a semiconductor piezoresistive 3-axis acceleration sensor. The acceleration sensor 35 measures the acceleration of the mobile device 3, and transmits the measured acceleration data to the control unit 31.

The function of the control unit 31 will be described. The control unit 31 includes the display control unit 31a, the signal transmission unit 31b, and an acceleration transmission unit 31c.

The signal transmission unit 31b transmits a start signal and an end signal to the vehicle apparatus 4. Here, the start signal indicates that the user operates the mobile device 3 so as to start controlling the parking of the vehicle, and the end signal indicates that the user operates the mobile device 3 so as to end to control the parking of the vehicle.

The display control unit 31a displays data such as images or characters on the display 33. The display control unit 31a changes images or the like to be displayed on the display 33 based on the position of a touch that is input to the touch panel 33a. The display control unit 31a displays a message for the user on the display 33.

The acceleration transmission unit 31c transmits the acceleration data transmitted from the acceleration sensor 35 to the vehicle apparatus 4 via the communication unit 32. The acceleration data acts as a motion signal.

Figure 12:
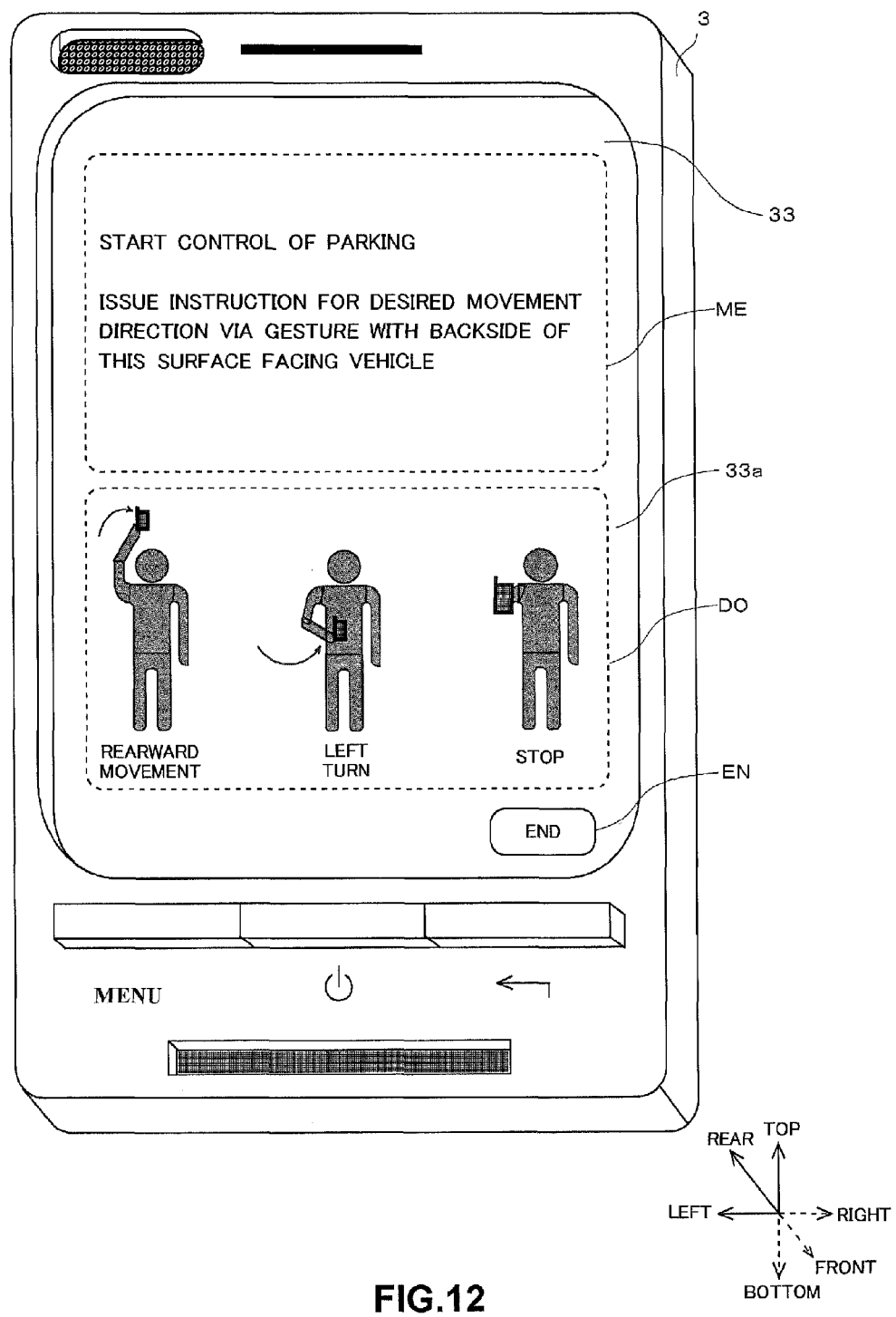
FIG. 12 illustrates an example of a display screen of the mobile device.

FIG. 12 illustrates an example of a message or the like for the user on the display 33 when the controlling of parking of the vehicle is started. The display 33 displays a message ME, a motion diagram DO, and an end button EN when the controlling of parking of the vehicle is started.

The message ME is a notice that has to be presented to the user when the controlling of parking of the vehicle is started. For example, the message ME may notify the user that "the controlling of parking of the vehicle is started, and the user is requested to issue an instruction for a movement direction via a gesture with the backside of this surface facing the vehicle". The user can recognize that the controlling of parking of the vehicle is started, and understand how to hold the mobile device 3 because the user refers to the message ME.

The motion diagram DO illustrates examples of a motion of the user who holds the mobile device 3. The user can understand how to hold and move the mobile device 3 because the user controls a travel direction of the vehicle 2 with reference to the motion diagram DO.

The end button EN is a button for ending an application for controlling of the parking of the vehicle. The user can end the application for controlling of the parking of the vehicle by operating the end button EN when the user does not desire to control the parking of the vehicle. The operation of the end button EN performed by the user is input to the control unit 31 via the touch panel 33a. It is possible to prevent acceleration data from being erroneously transmitted, and to improve safety when the application is ended.

Directions and orientations referred to in the following description are based on a 3-dimensional orthogonal coordinate system illustrated in FIG. 12. The orthogonal coordinate system is fixed relative to the mobile device 3. A forward direction is oriented to a front surface (surface that is referred to by the user in normal use of the device) of the mobile device 3, and a rearward direction is oriented to a back surface of the mobile device 3. A rightward direction is oriented to a right side surface of the mobile device 3, and a leftward direction is oriented to a left side surface of the mobile device 3. An upward direction is oriented to an upper surface of the mobile device 3, and a downward direction is oriented to a bottom surface of the mobile device 3. In the following description, the front and rear, the right and left, and the top and bottom of the mobile device 3 are defined in accordance with the definition illustrated in FIG. 12.

FIG. 13 illustrates an example of the motion data 430a. As described above, the motion data 430a is a data table, and contains various data that is referred to by the first recognition unit 410a and the second recognition unit 410b.

The motion data 430a includes three data groups. That is, the three data groups are a "movement instruction indicated by a motion of the user", the "mode of major acceleration of the mobile device", and an "image of the user captured by the vehicle-mounted camera". The data groups are associated with each other.

The "movement instruction indicated by a motion of the user" is data indicative of a movement direction or the like in controlling of the parking of the vehicle. The content of the data may be any one of "rearward movement", "forward movement", "right turn", "left turn", and "stop".

The "mode of major acceleration of the mobile device" is data indicative of a main direction of acceleration of the mobile device 3. The content of the data may be any one of the "occurrence (front-to-rear occurrence) of front-to-rear acceleration", the "occurrence (rear-to-front occurrence) of rear-to-front acceleration", the "occurrence (right-to-left occurrence) of right-to-left acceleration", the "occurrence (left-to-right occurrence) of left-to-right acceleration", and the "non-occurrence (non-occurrence) of acceleration".

The "image of the user captured by the vehicle-mounted camera" is data equivalent to an image of a front face of the user US captured by the vehicle-mounted camera 220. A plurality of still images are consecutively captured, and are recorded as a moving picture associated with motions. The content of the data may be any one of the following: a motion (front-to-rear motion) in which the user US puts up the mobile device 3 and swings the mobile device 3 from the front to the rear; a motion (rear-to-front motion) in which the user US puts up the mobile device 3 and swings the mobile device 3 from the rear to the front; a motion (right-to-left motion) in which the user US puts up the mobile device 3 and swings the mobile device 3 from the right to the left; a motion (left-to-right motion) in which the user US puts up the mobile device 3 and swings the mobile device 3 from the left to the right; and a motion (stop motion) in which the user US stops the mobile device 3.

The data can be associated with each other as follows. The "rearward movement" can be associated with the "front-to-rear occurrence" and the "front-to-rear motion", the "forward movement" can be associated with the "rear-to-front occurrence" and the "rear-to-front motion", the "right turn" can be associated with the "left-to-right occurrence" and the "left-to-right motion", the "left turn" can be associated with the "right-to-left occurrence" and the "right-to-left motion", and the "stop" can be associated with the "non-occurrence" and the "stop motion".

2-3. Process Steps

Figure 14:
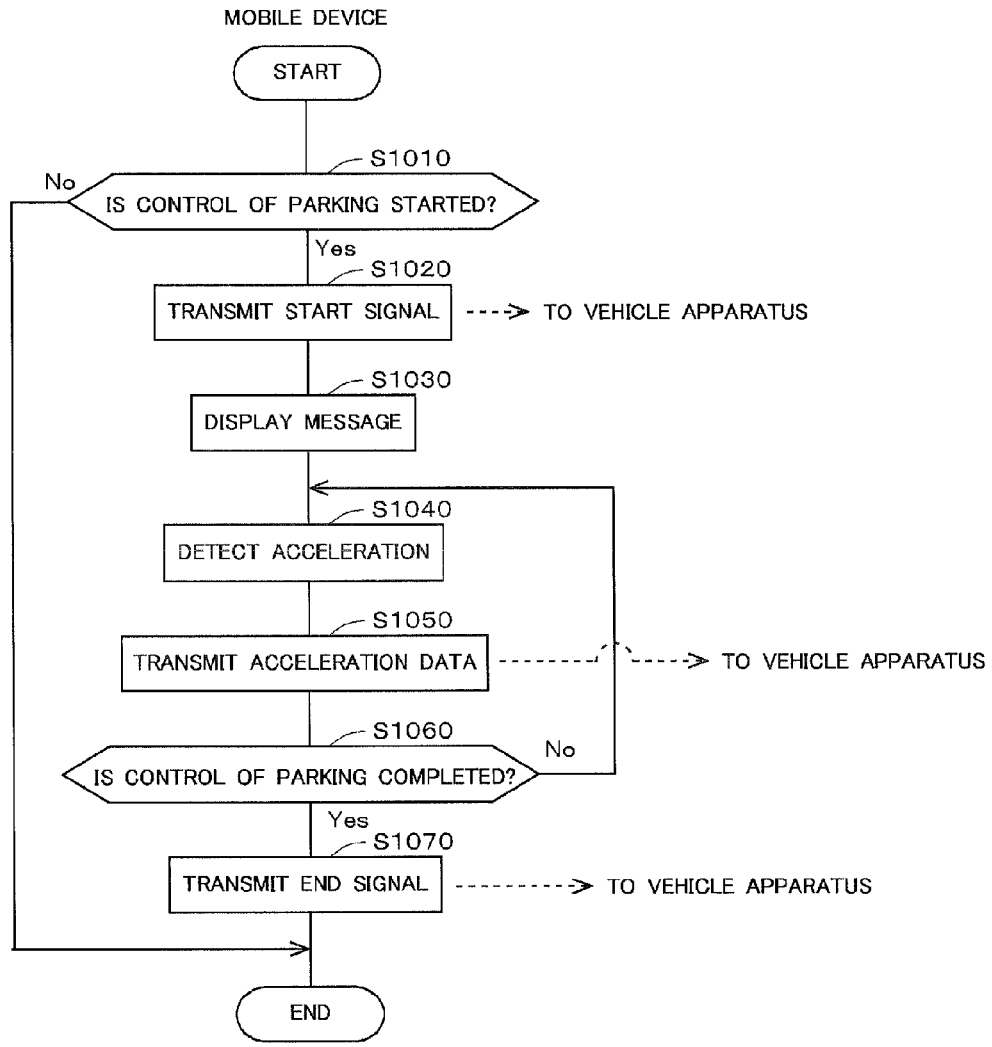
FIG. 14 illustrates process steps performed by the mobile device.

Hereinafter, process steps of each of the mobile device 3 and the vehicle apparatus 4 will be described. FIG. 14 illustrates the process steps of the mobile device 3. The process steps are repeatedly executed at a predetermined period.

The control unit 31 determines whether the user operates a start button for controlling the parking of the vehicle (step S1010).

When the control unit 31 determines that the start button is not operated (No in step S1010), the process ends. In this case, the process is re-executed after a predetermined period elapses.

In contrast, when the control unit 31 determines that the start button is operated (Yes in step S1010), the signal transmission unit 31b transmits a start signal to the vehicle apparatus 4 (step S1020). Accordingly, the vehicle apparatus 4 detects that the start button of the mobile device 3 is operated, and starts recognizing acceleration data and image data.

When the signal transmission unit 31b transmits the start signal, the display control unit 31a displays the message ME, the motion diagram DO, and the end button EN illustrated in FIG. 12 on the display 33 (step S1030). Accordingly, the user can understand the fact that the controlling of parking of the vehicle is started, and a motion that has to be taken by the user so as to instruct the vehicle 2 of a movement direction.

The acceleration sensor 35 detects acceleration (step S1040), and the acceleration transmission unit 31c transmits the detected acceleration data to the vehicle apparatus 4 (step S1050).

Subsequently, the control unit 31 determines whether the user operates the end button for controlling of the parking of the vehicle (step S1060).

When the control unit 31 determines that the end button is not operated (No in step S1060), the control unit 31 re-detects and re-transmits acceleration (step S1040 and step S1050). Thereafter, step S1040 and step S1050 are repeatedly executed until the user operates the end button. That is, the control unit 31 continuously transmits the acceleration of the mobile device 3 to the vehicle apparatus 4.

In contrast, when the control unit 31 determines that the end button is operated (Yes in step S1060), the signal transmission unit 31b transmits an end signal to the vehicle apparatus 4 (step S1070). Accordingly, the vehicle apparatus 4 can recognize that the end button of the mobile device 3 is operated.

When the signal transmission unit 31b transmits the end signal to the vehicle apparatus 4, the process ends. The reason for the ending of the process is that it is not necessary to transmit acceleration data to the vehicle apparatus 4 any longer because the user expresses an intention that the controlling of parking of the vehicle has to be ended.

Figure 15:
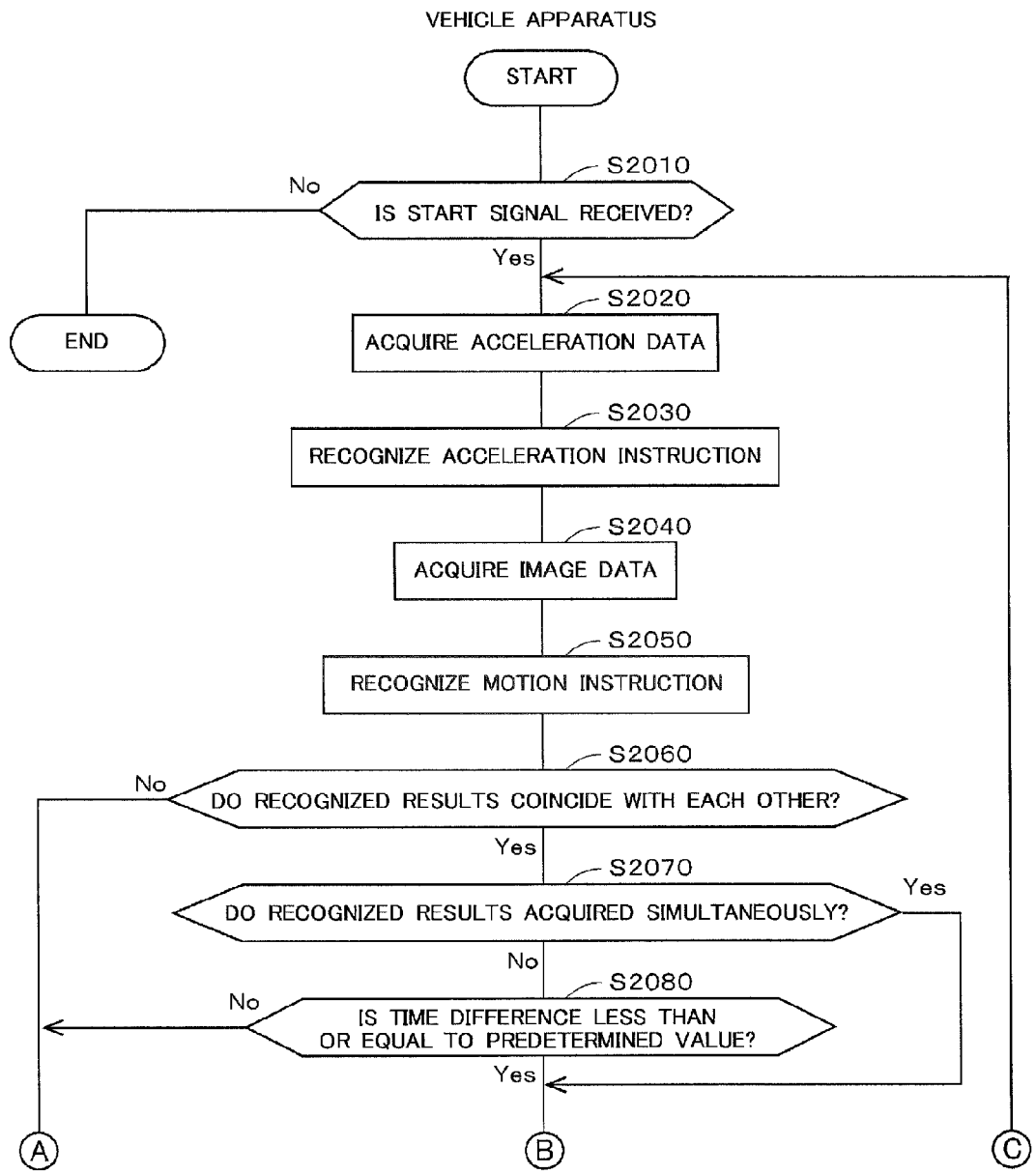
FIG. 15 illustrates process steps performed by the vehicle apparatus.
Figure 16:
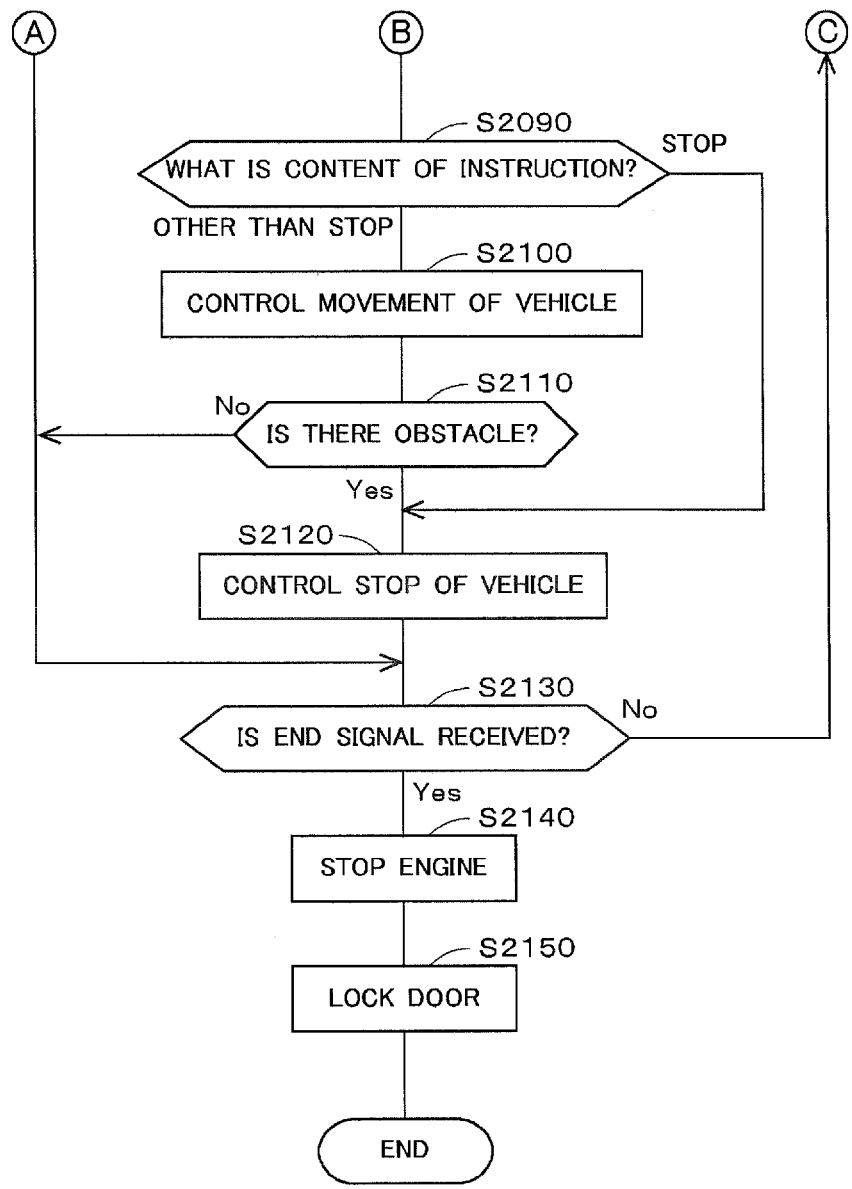
FIG. 16 illustrates process steps performed by the vehicle apparatus.

FIGS. 15 and 16 illustrate the process steps of the vehicle apparatus 4.

When the process illustrated in FIG. 15 is started, the control unit 41 determines whether the start signal from the mobile device 3 is received (step S2010).

When the control unit 41 determines that the start signal is not received (No in step S2010), the process ends. In this case, the process is re-executed after a predetermined period elapses.

In contrast, when the control unit 41 determines that the start signal is received (Yes in step S2010), the control unit 41 acquires the acceleration data transmitted from the mobile device 3 (step S2020).

When the control unit 41 acquires the acceleration data, the first recognition unit 410a recognizes a movement instruction indicated by a motion of the user based on the acquired acceleration data with reference to the motion data 430a. That is, the first recognition unit 410a recognizes any one of "rearward movement", "forward movement", "right turn", "left turn", and "stop" instructions based on an acceleration generation mode (step S2030). When the first recognition unit 410a recognizes a movement instruction, the first recognition unit 410a stores the content of the recognized movement instruction and the time (recognition time) for the movement instruction to be recognized in the RAM.

Subsequently, the control unit 41 acquires image data transmitted from the vehicle-mounted camera 220 (step S2040).

When the control unit 41 acquires the image data, the second recognition unit 410b recognizes a movement instruction indicated by a motion of the user based on the acquired image data with reference to the motion data 430a. That is, the second recognition unit 410b recognizes any one of the "rearward movement" instruction and the like based on a motion of the user in the image (step S2050). When the second recognition unit 410b recognizes a movement instruction, the second recognition unit 410b stores the content of the recognized movement instruction and the time (recognition time) for the movement instruction to be recognized in the RAM.

When the first recognition unit 410a and the second recognition unit 410b recognize the respective movement instructions, with reference to the recognized results stored in the RAM, the instruction determination unit 410c determines whether the movement instruction recognized by the first recognition unit 410a coincides with the movement instruction recognized by the second recognition unit 410b (step S2060).

When the instruction determination unit 410c determines that the movement instruction recognized by the first recognition unit 410a does not coincide with the movement instruction recognized by the second recognition unit 410b (No in step S2060), the process proceeds to step S2130 illustrated in FIG. 16. Step S2130 will be described later.

In contrast, when the instruction determination unit 410c determines that the movement instruction recognized by the first recognition unit 410a coincides with the movement instruction recognized by the second recognition unit 410b (Yes in step S2060), the instruction determination unit 410c determines whether the time for the first recognition unit 410a to acquire the recognized result coincides with the time for the second recognition unit 410b to acquire the recognized result, that is, whether both of the movement instructions are recognized simultaneously (step S2070). The instruction determination unit 410c makes the aforementioned determination with reference to both of the recognition times stored in the RAM and via a comparison therebetween.

When the instruction determination unit 410c determines that both of the movement instructions are recognized simultaneously (Yes in step S2070), the process proceeds to step S2090 illustrated in FIG. 16. In this case, it is possible to assume that the movement instructions are respectively recognized by the first recognition unit 410a and the second recognition unit 410b based on the same motion of the user.

In contrast, when the instruction determination unit 410c determines that both of the movement instructions are recognized non-simultaneously (No in step S2070), the instruction determination unit 410c determines whether a recognition time difference is less than a predetermined time, the recognition time difference indicating a difference between the time for the first recognition unit 410a to recognize the movement instruction and the time for the second recognition unit 410b to recognize the movement instruction (step S2080). The instruction determination unit 410c makes the aforementioned determination by referring to the time data 430b containing the predetermined time, and comparing the predetermined time with the difference in time required to recognize the movement instruction.

When the instruction determination unit 410c determines that the difference in time required to recognize the movement instruction is not in the predetermined time (No in step S2080), the process proceeds to step S2130 (to be described later) (refer to FIG. 16).

In contrast, when the instruction determination unit 410c determines that the difference in time required to recognize the movement instruction is less than the predetermined time (Yes in step S2080), the instruction determination unit 410c determines the content of the movement instruction (step S2090). In this case, it is possible to assume that the movement instructions are respectively recognized by the first recognition unit 410a and the second recognition unit 410b based on the same motion of the user. Here, the determined content of the movement instruction is the recognized results that coincide with each other, which is determined by the instruction determination unit 410c in step S2060. That is, the content of the movement instruction is any one of the "rearward movement", "forward movement", "right turn", "left turn", and "stop" instructions.

When the instruction determination unit 410c determines that the movement instruction is the "stop" instruction ("stop" in step S2090), the movement control unit 41d controls the stopping of the vehicle 2 (step S2120). In the controlling of stopping of the vehicle 2, the movement control unit 41d controls the brake control unit 53 of the vehicle moving apparatus 5 such that the brake control unit 53 operates the brake pedal 25, and the vehicle 2 is stopped. Accordingly, the stop instruction from the user is reflected in the operation of the vehicle 2.

In contrast, when the instruction determination unit 410c determines that the movement instruction is any one of the "rearward movement", "forward movement", "right turn", and "left turn" instructions ("instruction other than the "stop"" in step S2090), the movement control unit 41d controls the moving of the vehicle 2 (step S2100). In the controlling of moving of the vehicle 2, the movement control unit 41d controls the steering control unit 51, the throttle control unit 52, and the transmission control unit 54 of the vehicle moving apparatus 5 such that the vehicle 2 moves. That is, the control units 51, 52, and 54 operate the steering wheel 23, the electronic throttle body 24, and the transmission 26, respectively, such that the vehicle 2 moves in accordance with any one of the "rearward movement", "forward movement", "right turn", and "left turn". Accordingly, the instruction for moving the vehicle 2 from the user is reflected in the operation of the vehicle 2.

When the movement control unit 41d controls the moving of the vehicle 2, the control unit 41 determines whether there is an obstacle in the vicinity of the vehicle 2, based on a detection signal transmitted from the clearance sonar 240 (step S2110).

When the control unit 41 determines that there is no obstacle in the vicinity of the vehicle 2 (No in step S2110), the process proceeds to step S2130 (to be described later).

In contrast, when the instruction determination unit 410c determines that the movement instruction is the "stop" instruction ("stop" in step S2090), and the control unit 41 determines that there is an obstacle in the vicinity of the vehicle 2 (Yes in step S2110), the movement control unit 41d controls the stopping of the vehicle 2 (step S2120). In the controlling of stopping of the vehicle 2, the movement control unit 41d controls the brake control unit 53 of the vehicle moving apparatus 5 such that the brake control unit 53 operates the brake pedal 25, and the vehicle 2 is stopped. Accordingly, the stop instruction from the user is reflected in the operation of the vehicle 2.

When the movement control unit 41d controls the stopping of the vehicle 2 (step S2120), the process proceeds to step S2130. Step S2130 is a process step in which the control unit 41 determines whether an end signal from the mobile device 3 is received.

When the control unit 41 determines that the end signal from the mobile device 3 is not received (No in step S2130), the process proceeds to step S2020, and the control unit 41 re-executes the steps following the step of acquiring the acceleration data from the mobile device 3.

In contrast, when the control unit 41 determines that the end signal from the mobile device 3 is received (Yes in step S2130), the body control unit 410e controls the IG switch 21 such that the IG switch is turned off, and the engine is stopped (step S2140). The body control unit 410e controls the locking of doors such that the doors of the vehicle 2 are locked (step S2150). When the doors are locked, the process ends.

As described above, in the embodiment of the present invention, a movement instruction based on a motion of the body of the user US is recognized based on acceleration data associated with the motion which is transmitted from the mobile device 3 that is moved in association with the motion of the body of the user US. In addition, the movement instruction is recognized based on an image result of the motion of the user captured by the vehicle-mounted camera 220. The vehicle 2 moves when the recognized result based on the acceleration data coincides with the recognized result based on the image result. Accordingly, it is possible to more reliably recognize an instruction for moving the vehicle 2 from the user US, and to move the vehicle 2 compared to based on only the image result.

2-4. Modification Example

The second embodiment has been described up to this point; however, the present invention is not limited to the second embodiment, and can be modified. Hereinafter, a modification example will be described. The aforementioned embodiment and embodiments to be described hereinbelow can be appropriately combined.

In the second embodiment, the vehicle-mounted camera 220 is used as a device for detecting a motion of the user. However, a 3-dimensional laser radar may be used in replacement of the vehicle-mounted camera 220. Any type of device may be used insofar as the device can detect a motion of the user.

In the second embodiment, a movement instruction indicated by a motion of the user is recognized by the first recognition unit 410a and the second recognition unit 410b. However, the first recognition unit 410a and the second recognition unit 410b may be configured as a single recognition unit. In this case, the single recognition unit recognizes a movement instruction indicated by a motion of the user.

In the second embodiment, a movement instruction indicated by a motion of the user is recognized based on acceleration data and image data. The mobile device 3 may further include a microphone, and a movement instruction given by the user may be recognized based on a voice message from the user. For example, the user may input a voice message such as "moving the vehicle rearward a little more" to the mobile device 3, and the "rearward movement" instruction may be recognized. In this case, the vehicle 2 may move when two or three movement instructions out of the acceleration data, the image data, and the voice data coincide with each other, the movement instructions being indicated by a motion of the user.

In the second embodiment, the user takes a motion to issue a movement instruction while holding the mobile device 3 toward a predetermined orientation. However, the mobile device 3 includes an electronic compass, and the mode of major acceleration of the mobile device 3 may be detected based on an orientation indicated by the electronic compass. The mobile device 3 transmits orientation data along with acceleration data to the vehicle apparatus 4. In this case, it is not necessary for the user to hold the mobile device 3 toward the predetermined orientation, and it is possible to improve the degree of freedom of a motion of the user.

In the second embodiment, when the mode of major acceleration of the mobile device 3 is right-to-left (left-to-right) acceleration, the "left turn" ("right turn") instruction is recognized, and the vehicle 2 moves accordingly. At this time, preferably, the vehicle 2 turns at a predetermined angle when acceleration occurs initially, and the vehicle 2 turns at a small angle when acceleration occurs subsequently. For example, the predetermined angle may be 15°, and a small angle may be 5°. In this case, the user can finely adjust a turning angle in response to an instruction, and it is possible to improve convenience in issuing a turn instruction.

The turning angle may be changed depending on the magnitude of acceleration or a motion. That is, when large acceleration and a large motion are recognized, the vehicle 2 turns at 30°, and when small acceleration and a small motion are recognized, the vehicle 2 turns at 5°. The turning angle may be changed in proportion to the magnitude of acceleration or a motion. With this technique, it is possible to improve convenience in issuing a turn instruction.

In the second embodiment, when the instruction determination unit 410c determines that a movement instruction recognized by the first recognition unit 410a does not coincide with a movement instruction recognized by the second recognition unit 410b in step S2060 illustrated in FIG. 15, the control unit 41 determines whether an end signal is received (step S2130). However, when the instruction determination unit 410c determines that the movement instructions respectively recognized by both the recognition units (41a and 41b) do not coincide with each other, the movement control unit 41d may immediately stop a movement of the vehicle 2. The reason for the immediate stopping of the vehicle 2 is that the instruction from the user is unclear. In this case, it is possible to further improve safety.

In the second embodiment, a movement direction and a movement distance in the forward, rearward, rightward, and leftward directions may be instructed by displaying buttons on the display 33 of the mobile device 3, and tapping the buttons (pressing the touch panel with a finger). The movement direction and the movement distance may be instructed using another type of operation. The other type of operation may be a so-called swipe operation (swiping a finger in a certain direction while pressing the touch panel). That is, the movement direction and the movement distance of the vehicle 2 may be instructed by the swiping of the finger on the touch panel 33a, and the movement direction and the movement distance of the finger on the touch panel 33a.

While the vehicle 2 is moving, a speaker (not illustrated) may issue a warning sound. In this case, it is possible to warn the user, pedestrians in the vicinity of the vehicle 2, and the like that the vehicle 2 is moving, and therefore, it is possible to improve safety. Preferably, the warning sound is continuously issued from before a start of the movement. It is possible to further improve safety by forewarning persons in the vicinity of the vehicle 2 to start moving.

In the second embodiment, the vehicle control system 1 is mounted in a vehicle, and the vehicle may be transportation equipment including a two wheeler, a railroad vehicle, an airplane, a ship, and the like in addition to an automobile. The vehicle includes a military purpose vehicle in addition to a civilian purpose vehicle, and includes a commercial purpose vehicle in addition to a private vehicle. The vehicle control system 1 may be installed not only in a vehicle but also in a lifting machine such as an elevator or an escalator. In summary, the vehicle control system 1 is preferably installed in equipment that requires movement control.

While the invention has been shown and described in detail, the foregoing description is in all aspects illustrative and not restrictive. It is therefore understood that numerous other modifications and variations can be devised without departing from the scope of the invention.

What is claimed is:

1. A vehicle apparatus used in a vehicle, the apparatus comprising:
    a clock configured to measure a first elapsed time after completion of a parking operation by which the vehicle is parked at a parking position in a parking region while an ignition signal of the vehicle is in an on state, the clock starting counting of the first elapsed time upon satisfaction of two conditions which are closing of a door of the vehicle after the door has been opened and the ignition signal of the vehicle switching to an off state;
    a receiver configured to receive an instruction signal from a mobile device operated by a user outside the vehicle while the ignition signal of the vehicle is in the off state;
    a first recognition part configured to recognize, based on a motion signal transmitted from the mobile device that is moved in association with a motion of a body of the user, a movement instruction based on the motion of the body of the user, the movement instruction being indicative of moving the vehicle;
    a second recognition part configured to recognize the movement instruction based on a detection result of a detector that is configured to detect the motion of the body of the user without the motion signal transmitted from the mobile device; and
    a control unit configured to cause movement of the vehicle to adjust the parking position of the vehicle in response to the received instruction signal when a recognized result obtained by the first recognition part coincides with a recognized result obtained by the second recognition part, wherein
    the control unit is further configured to prohibit the movement of the vehicle to adjust the parking position when the first elapsed time reaches a first predetermined time before receipt of the instruction signal by the receiver.

2. The vehicle apparatus according to claim 1, wherein the parking operation is an operation by which the vehicle is controlled to be automatically parked in the parking region.

3. The vehicle apparatus according to claim 1, wherein the parking operation is an operation in which the user parks the vehicle in the parking region.

4. The vehicle apparatus according to claim 1, wherein when (1) the first elapsed time is less than the first predetermined time and (2) the instruction signal is received, the clock measures an amount of time elapsed after completion of the movement of the vehicle instructed by the instruction signal as a second elapsed time, and
    the control unit prohibits further movement of the vehicle to further adjust the parking position when the second elapsed time reaches a second predetermined time without receipt of a further instruction signal.

5. The vehicle apparatus according to claim 1, wherein when the parking operation was conducted by user without automatic parking, the control unit sets the first predetermined time to be longer compared to when the parking operation was conducted with automatic parking.

6. The vehicle apparatus according to claim 1, wherein the control unit causes the vehicle to be moved when a time difference is less than a predetermined time, the time difference indicating a difference between a time for the first recognition part to obtain the recognized result and a time for the second recognition part to obtain the recognized result.

7. The vehicle apparatus according to claim 1, wherein the control unit causes the vehicle to be moved when the recognized results are simultaneously obtained by the first recognition part and the second recognition part.

8. The vehicle apparatus according to claim 1, wherein the mobile device includes an acceleration sensor, and the motion signal contains acceleration data obtained by the acceleration sensor.

9. The vehicle apparatus according to claim 1, wherein the detector is a camera mounted on the vehicle, and the detection result is image data that is obtained by imaging the motion of the body of the user using the camera.

10. A vehicle control system that is configured to control a vehicle, the system comprising:
    a vehicle drive system configured to move the vehicle;
    a mobile device that is operated by a user outside the vehicle to transmit an instruction signal; and
    a vehicle apparatus that is used in the vehicle,
    wherein the vehicle apparatus includes:
    a clock configured to measure a first elapsed time after completion of a parking operation by which the vehicle is parked at a parking position in a parking region while an ignition signal of the vehicle is in an on state, the clock starting counting of the first elapsed time upon satisfaction of two conditions which are closing of a door of the vehicle after the door has been opened and the ignition signal of the vehicle switching to an off state;

a receiver configured to receive an instruction signal from the mobile device while the ignition signal of the vehicle is in the off state;

a first recognition part configured to recognize, based on a motion signal transmitted from the mobile device that is moved in association with a motion of a body of the user, a movement instruction based on the motion of the body of the user, the movement instruction being indicative of moving the vehicle;

a second recognition part configured to recognize the movement instruction based on a detection result of a detector that is configured to detect the motion of the body of the user without the motion signal transmitted from the mobile device; and a control unit configured to instruct the vehicle drive system to adjust the parking position of the vehicle in response to the received instruction signal when a recognized result obtained by the first recognition part coincides with a recognized result obtained by the second recognition part, wherein the control unit is further configured to prohibit the vehicle drive system from adjusting the parking position when the first elapsed time reaches a first predetermined time before receipt of the instruction signal by the receiver.

11. A vehicle control method of controlling a vehicle, the method comprising the steps of:

(a) measuring, with a clock of the vehicle, a first elapsed time after completion of a parking operation by which the vehicle is parked at a parking position in a parking region while an ignition signal of the vehicle is in an on state, the clock starting counting of the first elapsed time upon satisfaction of two conditions which are closing of a door of the vehicle after the door has been opened and the ignition signal of the vehicle switching to an off state;

(b) receiving, with a receiver of the vehicle, an instruction signal from a mobile device that is operated by a user outside the vehicle while the ignition signal of the vehicle is in the off state;

(c) recognizing, based on a motion signal transmitted from the mobile device that is moved in association with a motion of a body of the user, a movement instruction based on the motion of the body of the user, the movement instruction being indicative of moving the vehicle;

(d) recognizing the movement instruction based on a detection result of a detector that is configured to detect the motion of the body of the user without the motion signal transmitted from the mobile device;

(e) controlling a vehicle drive system of the vehicle to adjust the parking position of the vehicle by moving the vehicle in response to the received instruction signal when a recognized result obtained by the step (c) coincides with a recognized result obtained by the step (d); and (f) prohibiting the step (e) from adjusting the parking position when the first elapsed time reaches a first predetermined time before receipt of the instruction signal by the receiver.

12. The vehicle control method according to claim 11, wherein
the step (a) is an operation by which the vehicle is controlled to be automatically parked in the parking region.

13. The vehicle control method according to claim 11, wherein
the step (a) is an operation in which the user parks the vehicle in the parking region.

14. The vehicle control method according to claim 11, wherein
when (1) the first elapsed time is less than the first predetermined time and (2) the instruction signal is received, after completion of the moving of the vehicle according to step (e), further performing the steps of (g) measuring an amount of time elapsed after the completion of the movement of the vehicle instructed by the instruction signal as a second elapsed time, and (h) prohibiting further movement of the vehicle to further adjust the parking position when the second elapsed time reaches a second predetermined time without receipt of a further instruction signal.

15. The vehicle control method according to claim 11, wherein
when the parking operation was conducted by the user without automatic parking, the step (f) sets the first predetermined time to be longer compared to when the parking operation was conducted with automatic parking.

16. The vehicle control method according to claim 11, wherein
the step (e) moves the vehicle when a time difference is less than a predetermined time, the time difference indicating a difference between a time for the step (c) to obtain the recognized result and a time for the step (d) to obtain the recognized result.

17. The vehicle control method according to claim 11, wherein
the step (e) moves the vehicle when the recognized results are simultaneously obtained by the step (c) and the step (d).

* * * * *